United States Patent
Fletcher et al.

(10) Patent No.: US 7,031,493 B2
(45) Date of Patent: Apr. 18, 2006

(54) METHOD FOR GENERATING AND DETECTING MARKS

(75) Inventors: Peter Alleine Fletcher, Rozelle (AU); Kieran Gerard Larkin, Putney (AU)

(73) Assignee: Canon Kabushiki Kaisha, Tokyo (JP)

( * ) Notice: Subject to any disclaimer, the term of this patent is extended or adjusted under 35 U.S.C. 154(b) by 651 days.

(21) Appl. No.: 09/983,031

(22) Filed: Oct. 22, 2001

(65) Prior Publication Data
US 2002/0085735 A1 Jul. 4, 2002

(30) Foreign Application Priority Data
Oct. 27, 2000 (AU) .................................... PR1050

(51) Int. Cl.
*H04K 1/00* (2006.01)
(52) U.S. Cl. ................................... 382/100
(58) Field of Classification Search ............... 382/100, 382/232, 278; 380/210, 287, 54; 713/176
See application file for complete search history.

(56) References Cited

U.S. PATENT DOCUMENTS

| 5,257,325 | A | | 10/1993 | Casparian et al. ............. 382/44 |
| 5,835,639 | A | * | 11/1998 | Honsinger et al. ........... 382/278 |
| 6,266,452 | B1 | | 7/2001 | McGuire ..................... 382/294 |
| 6,282,300 | B1 | * | 8/2001 | Bloom et al. ................ 382/100 |
| 6,665,418 | B1 | * | 12/2003 | Honsinger ................... 382/100 |

FOREIGN PATENT DOCUMENTS

| EP | 1 003 324 A2 | 5/2000 |
| JP | 2000-268178 A | 9/2000 |
| WO | WO 98/03014 A1 | 1/1998 |
| WO | WO 00/07356 A2 | 2/2000 |
| WO | WO 00/39955 A1 | 7/2000 |

OTHER PUBLICATIONS

Tsekeridou et al., "Copyright Protection of Still Images Using Self-Similar Chaotic Watermarks," *Proc. 2000 Int. Conf. on Image Processing*, vol. I, Sep. 2000, pp. 411-414.*

Kutter, "Watermarking resisting to translation, rotation, and scaling," *Proc. SPIE vol. 3528: Multimedia Systems and Applications*, Nov. 1998, pp. 423-431.*

"Rotation, Scale and Translation Invarient Spread Spectrum Digital Image Watermarking", J. Ó Ruanaidh, et al., Signal Processing 66, (3), 1998, pp. 303-317.

"Scale Invariant Pattern Recognition with Logarithmic Radial Harmonic Filters", J. Rosen, et al., Applied Optics 28, (2), 1989, pp. 240-244.

Richard A. Altes, "Signal Processing for Target Recognition in Biosonar," Neural Networks, vol. 8, No. 7/8, 1995, pp. 1275-1295.

Qin-sheng Chen, et al., "Symmetric Phase-Only Matched Filtering of Fourier-Mellin Transforms for Image Registration and Recognition," IEEE Transactions on Pattern Analysis and Machine Intelligenece, No. 12, Dec. 1994.

Joseph J.K. Ó Ruanaidh, et al., "Rotation, Scale and Translation Invariant Spread Spectrum Digital Image Watermarking," Signal Processing, No. 66, 1998, pp. 303-317.

Joseph Rosen, et al., "Scale Invariant Pattern Recognition with Logarithmic Radial Harmonic Filters," Applied Optics, vol. 28, No. 2, Jan. 1989, pp. 240-244.

Joseph Rosen, et al., "Circular Harmonic Phase Filters for Efficient Rotation-Invariant Pattern Recognition," Applied Optics, vol. 27, No. 14, Jul. 1988, pp. 2895-2899.

* cited by examiner

*Primary Examiner*—Andrew W. Johns
(74) *Attorney, Agent, or Firm*—Fitzpatrick, Cella, Harper & Scinto

(57) ABSTRACT

Methods (450, 750) are disclosed for embedding a watermark into an image (400, 700). The watermark comprises at least one basis pattern. A real part of the basis pattern(s) (410, 710) is added to the image (400, 700) to form a watermarked image (420, 730). The basis pattern(s) has scale and rotation invariant properties. The pattern(s) is preferably added to the image at a low intensity to make the pattern(s) invisible or imperceptible to the human visual system under normal viewing conditions. Methods (800, 900) are also disclosed for detecting a watermark from a watermarked image (810, 910). The watermark image (810, 910) is correlated with the basis pattern to provide a result image (830, 950). Peaks in the result image (830, 950) correspond with positions where the basis pattern was detected in the watermarked image (830, 950)

98 Claims, 15 Drawing Sheets

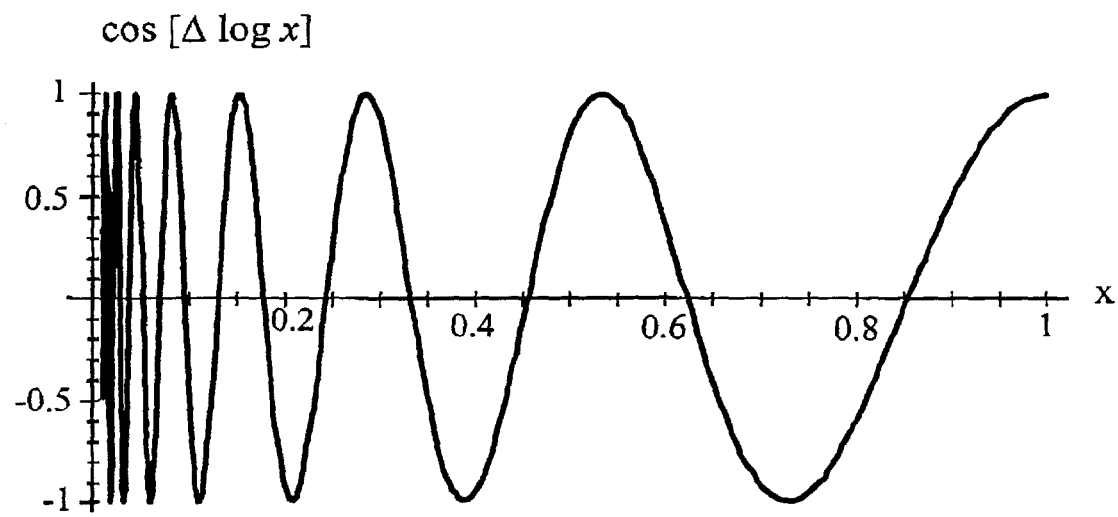
Fig. 1
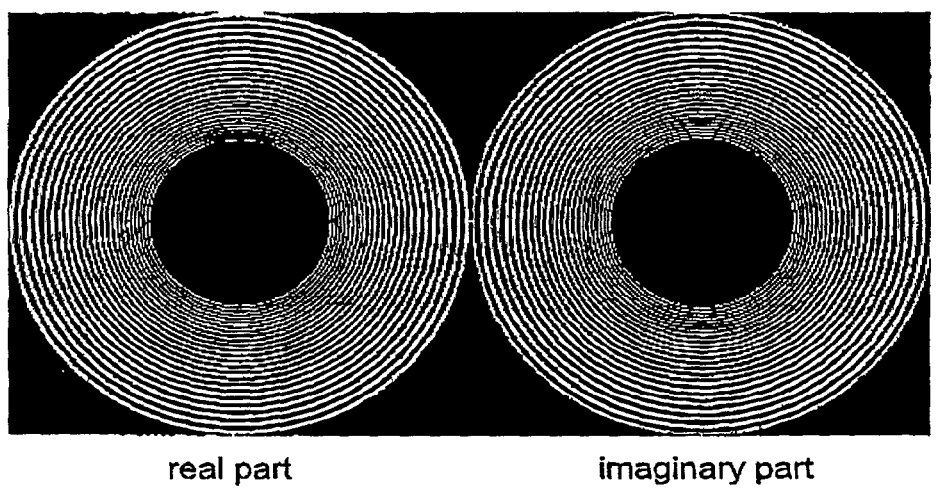
Fig. 2A      Fig. 2B

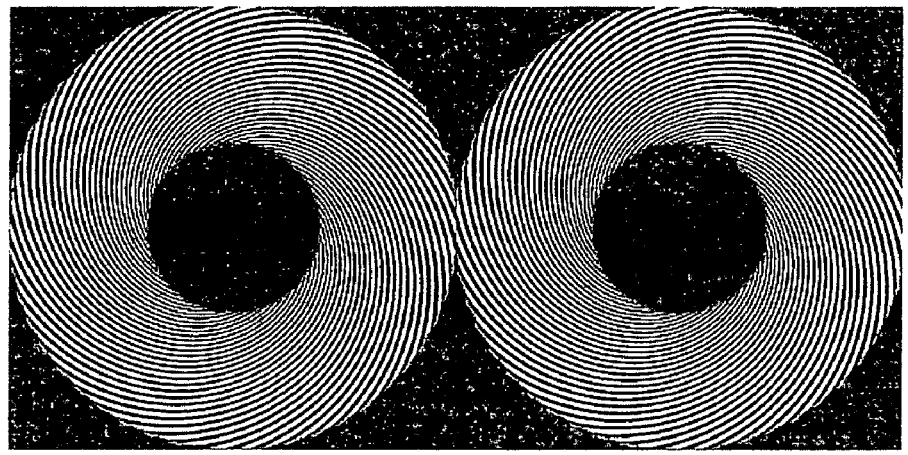
real part        imaginary part
Fig. 3A        Fig. 3B
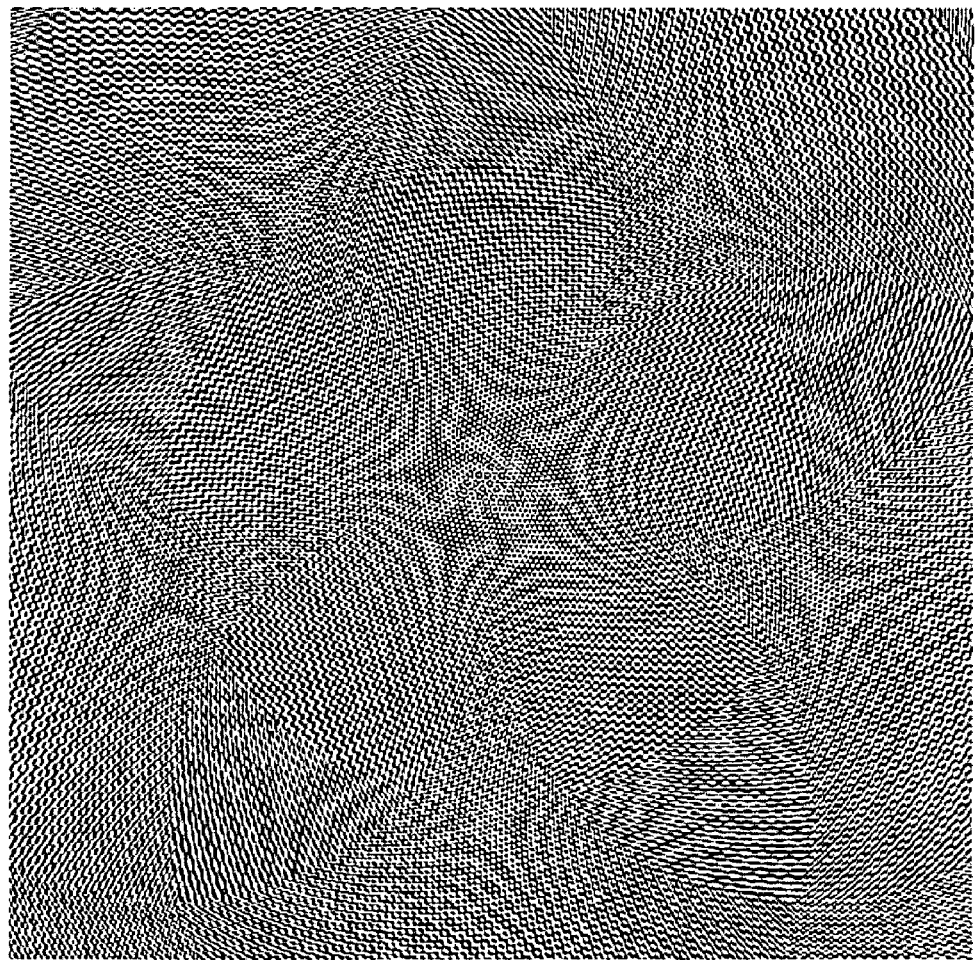
Fig. 5

METHOD FOR GENERATING AND DETECTING MARKS

TECHNICAL FIELD OF THE INVENTION

The present intention relates to the generation, embedding and detection of patterns in images, audio streams, video, and documents or surfaces of articles. Such embedded patterns may be used for invisible watermarking, and/or for alignment information. In particular, the present invention relates to embedded patterns that have scale and rotation invariant properties.

BACKGROUND ART

With the advent of digital images and digital image distributions protection of such digital images against unauthorised copying has become an issue for image publishers and authors One technique used to identify the ownership of an image is to embed a pattern or patterns into the image, such that the embedded pattern is not visible to the naked eye of an observer. Such a pattern is called a watermark. The presence of the watermark can be detected in the copied image by the owner of the original image, thereby proving their ownership.

Systems are known for embedding a pattern or patterns into an image or document. However, present methods of invisible watermarking of documents and images are often very sensitive, therefore not robust, to geometric image distortions. The most common image distortions are changes in the magnification or scaling, changes to the orientation of the image or rotation, and losing edge information of the image or cropping.

Known methods which are robust to such changes, are either incapable of storing significant amounts of data in the watermark, or are susceptible to malicious intervention for the reason that the pattern is easily detected by simple spectral methods. One such spectral method is an analysis of the Fourier magnitude peaks of the image with an embedded watermark.

One of the most popular and effective methods for detecting patterns is correlation. In fact, for linear systems, correlation, or matched filtering, can be shown to be mathematically an optimal detection method. Unfortunately correlation in two dimensions is not, in general, invariant with orientation or scaling.

It should be noted that correlation can only give well defined and easily distinguished correlation magnitude peaks if the underlying pattern has a broad Fourier magnitude distribution. This is a consequence of the uncertainty principle. Therefore, patterns with very sharp or constrained Fourier magnitudes, such as a narrow-bandpass function, are ill equipped for correlation purposes.

Rotation invariance in known systems is typically achieved by using circular symmetric patterns. Alternatively the correlation can be repeated many times with the test pattern at many different orientations, so that at least one correlation is close to the actual orientation. Scale related problems are usually solved by repeated correlations at many different scales so that at least one correlation is close to the actual scale. Such methods are impractical, and as a consequence correlation seldom is used in cases when arbitrary rotation and/or scaling is present.

DISCLOSURE OF THE INVENTION

It is an object of the present invention to substantially overcome, or at least ameliorate, one or more disadvantages of existing arrangements.

According to a first aspect of the invention, there is provided a method of embedding a watermark into an image, said method comprising the step of:

maintaining at least one basis pattern; and adding said basis pattern(s) to said image, said basis pattern(s) being formed substantially from a basis function, wherein said basis function is defined such that said basis function when correlated with a scaled and rotated version of said basis function is substantially equal to the auto-correlation of said function within a complex multiplicative constant.

According to a second aspect of the invention, there is provided a method of detecting a watermark from an image, said watermark having a first basis pattern embedded, said method comprising the steps of:

maintaining a second basis pattern; and detecting said first basis pattern in said image using said second basis pattern, said first and second basis patterns being formed substantially from a basis function, wherein said basis function is defined such that said basis function when correlated with a scaled and rotated version of said basis function is substantially equal to the auto-correlation of said function within a complex multiplicative constant.

According to a third aspect of the invention, there is provided a method of adding registration marks to an image, said method comprising the step of:

maintaining at least one basis pattern, said basis pattern(s) being formed substantially from a basis function, wherein said basis function is defined such that said basis function when correlated with a scaled and rotated version of said basis function is substantially equal to the auto-correlation of said function within a complex multiplicative constant;

adding said basis pattern(s) to said image at at least three predetermined offsets relative to a center of said image.

According to a fourth aspect of the invention, there is provided a method of registering a transformed image, wherein a first basis pattern is embedded in said image before transformation at at least three predetermined positions, said method comprising the steps of:

maintaining a second basis pattern;

detecting said first basis pattern in said transformed image using said second basis pattern, said first and second basis patterns being formed substantially from a basis function, wherein said basis function is defined such that said basis function when correlated with a scaled and rotated version of said basis function is substantially equal to the auto-correlation of said function within a complex multiplicative constant;

comparing positions of said first pattern with said predetermined positions;

determining linear transformations for transforming said positions of said first pattern with said predetermined positions; and transforming said image to invert said linear transformations.

According to a fifth aspect of the invention, there is provided a method of embedding a watermark into an audio stream, said method comprising the step of:

maintaining at least one basis pattern; and adding said basis pattern(s) to said audio stream, said basis pattern(s) being formed substantially from a basis function, wherein said basis function is defined such that said basis function when correlated with a scaled version of said basis function is substantially equal to the auto-correlation of said function within a complex multiplicative constant.

According to a sixth aspect of the invention, there is provided a method of detecting a watermark from an audio stream, said watermark having a first basis pattern embedded, said method comprising the steps of:

maintaining a second basis pattern; and detecting said first basis pattern in said audio stream using said second basis pattern, said first and second basis patterns being formed substantially from a basis function, wherein said basis function is defined such that said basis function when correlated with a scaled version of said basis function is substantially equal to the auto-correlation of said function within a complex multiplicative constant.

According to yet another aspect of the invention, there is provided an apparatus for implementing any one of the aforementioned methods.

According to yet another aspect of the invention there is provided a program stored in a memory medium for implementing any one of the methods described above.

BRIEF DESCRIPTION OF THE DRAWINGS

A number of embodiments of the present invention will now be described with reference to the drawings, in which:

FIG. 1 shows a section of a scale invariant function;

FIGS. 2A and 2B show the real and imaginary parts of a logarithmic radial phase function having an annular region defined by minimum and maximum radii;

FIGS. 3A and 3B show the real and imaginary parts of a logarithmic radial harmonic phase function;

FIG. 5 shows an example watermark pattern;

DETAILED DESCRIPTION

Figure 4:
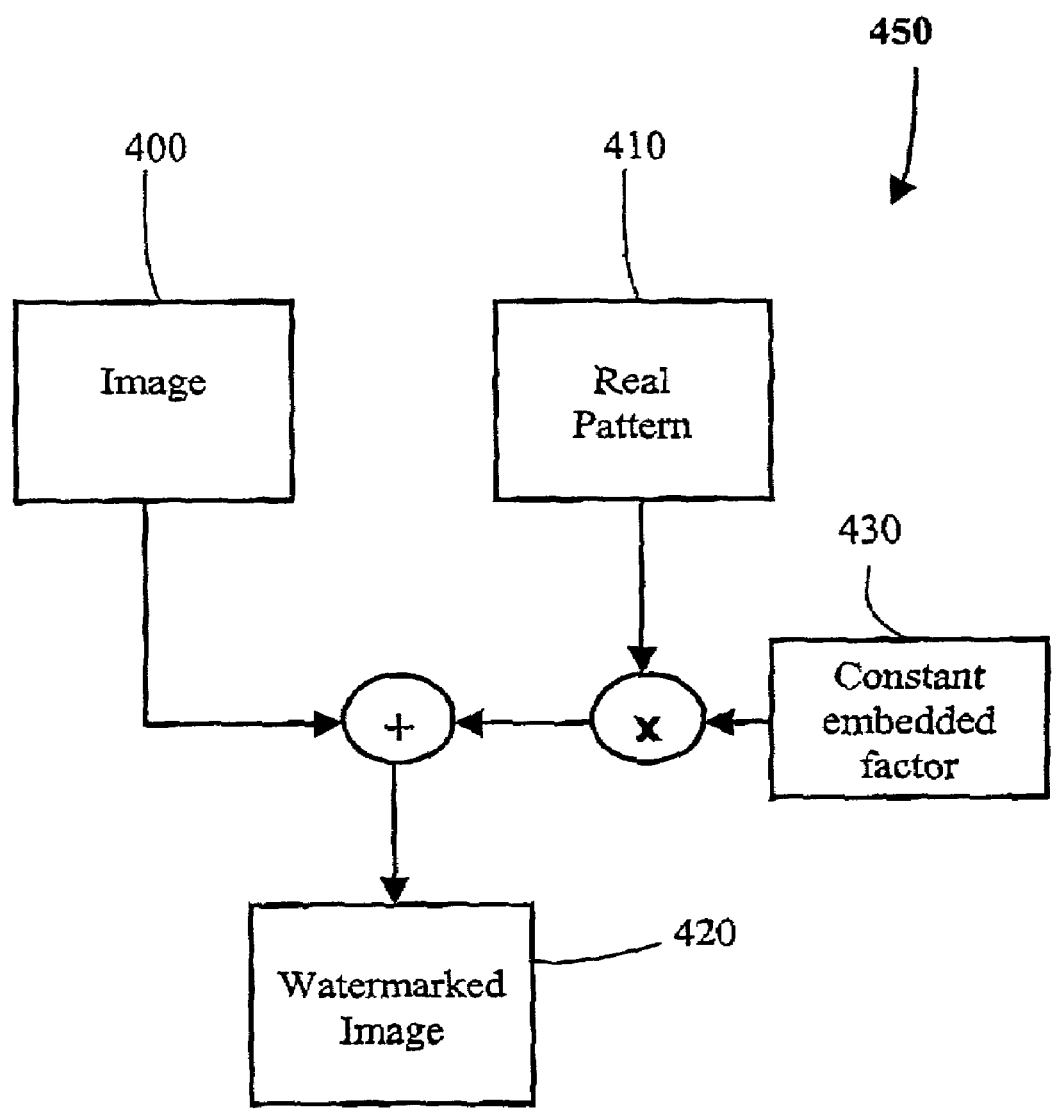
FIG. 4 shows a schematic diagram of a process of watermarking an image.

Basic properties of a group of functions, including their correlation properties, will first be described. Processes for watemarking, watermark detection, and apparatus follows the description of the basic properties of those functions.

Certain functions have a scale invariant property, whereby a change of scale in the coordinate results in a transformed function that is the same as the original functions apart from a multiplicative constant. These functions are sometimes referred to as homogeneous functions. Consider a homogeneous function:

$$f(r)=\cos[\alpha\ln(r)] \quad (1)$$

having a logarithmic phase as follows:

$$\psi(r)=\alpha\ln(r) \quad (2)$$

Such a phase has a frequency of $$\frac{d\psi}{dr}=\frac{\alpha}{r}.$$

The function $f(r)$ has the useful scaling property, in that:

$$f(ar)=\cos[\alpha\ln(ar)]=\cos[\alpha\ln(r)+\alpha\ln(a)] \quad (3)$$

In other words, a coordinate scale change only produces a fixed phase change in the cosine. The function in Equation (1) has some peculiar properties, such as an infinite number of periods in the range $0 \leq r < \epsilon$, and the phase approaches $-\infty$ as the radius tends to zero. The undesired effects of these properties can be largely avoided by removal of a central region below a threshold radius. FIG. 1 shows a one-dimensional example of a simple oscillating homogeneous function having the form of Equation (1), for values $0.01 \leq x \leq 1$.

The homogeneity condition can also be viewed as a self-similarity criterion. Self-similar functions produce correlation magnitude peaks even when one of the correlated functions is rescaled. A complex function with the self-similarity property is:

$$f_\alpha(r)=r^p \exp[i\alpha\ln(r)] \quad (4)$$

A scale change provides:

$$f_\alpha(ar)=a^p r^p \exp[i\alpha\ln(r)]\exp[i\alpha\ln(a)]=a^p \exp[i\alpha\ln(a)]f_\alpha(r) \quad (5)$$

which introduces a magnitude and phase change. By using a complex exponent:

$$\exp[i\alpha\ln(r)]=r^{i\alpha} \quad (6)$$

Equation (4) can be written as:

$$f_\alpha(r)=r^{p+i\alpha} \quad (7)$$

Equation (7) represents a family of functions, which have a periodic radial structure. FIGS. 2A and 2B show the real and imaginary parts of a pattern having the form of Equation (7) where a polar distance r is defined in terms of the Cartesian axes as $r^2=x^2+y^2$ and in which values of $r \leq R_1$ has been removed to avoid aliasing. The complex function $f_\alpha(r)$ has negative values. Therefore, for the function $f_\alpha(r)$ to be displayed, the values the function $f_\alpha(r)$ have been normalised around a value of 127, with all values ranging from 0 to 255, with 0 representing black, 255 representing white, and intermediate levels representing levels of grey.

Functions of the form of Equation (7) have some useful orthogonality properties over an annular region, with the annular region defined by a maximum radius $R_2$ and the minimum radius $R_1$. Consider the radial function:

$$f_m(r) = r^p r^{j\alpha_m} \qquad (8)$$

The correlation at the origin, or zero shift, is defined by an overlap integral $I_{mn}$ of this function $f_m(r)$ with another similar function $f_n(r)$ with parameter $\alpha_n$ instead of parameter $\alpha_m$, and can be written in polar coordinates as:

$$I_{mn} = \int_{R_1}^{R_2} 2\pi r f_m(r) f_n^*(r) dr = \frac{2\pi \left( R_2^{2p+2} R_2^{i(\alpha_m - \alpha_n)} - R_1^{2p+2} R_1^{i(\alpha_m - \alpha_n)} \right)}{2p + 2 + i(\alpha_m - \alpha_n)} \qquad (9)$$

From Equation (9), it can be seen that a prerequisite of orthogonality of the functions $f_m(r)$ and $f_n(r)$, is that $p=-1$. For one-dimensional functions, the orthogonality prerequisite is $p=-\frac{1}{2}$.

Generally, the magnitude squared of the overlap integral $|I_{mn}|^2$ may be written as a sinc function as follows:

$$|I_{mn}|^2 = \frac{(4\pi)^2 \sin^2\left( \frac{1}{2} [\alpha_m - \alpha_n] \ln[R_2/R_1] \right)}{(\alpha_m - \alpha_n)^2} \qquad (10)$$

The magnitude of the overlap integral $|I_{min}|$ is a maximum as the parameters $\alpha_n$ and $\alpha_m$ approach $\alpha_n - \alpha_m = 0$, and zero when $$\alpha_m - \alpha_n = \frac{2\pi j}{\ln[R_2/R_1]}, \; j = \text{integer, but } j \neq 0 \qquad (11)$$

In practice, the magnitude of the overlap integral $|I_{mn}|$ is small or negligible when $$|\alpha_m - \alpha_n| > \frac{2\pi}{\ln[R_2/R_1]} \qquad (12)$$

The above condition is an approximate orthogonality condition, useful for estimation purposes. In practice the ratio $R_2/R_1$ is chosen to be of the order 2 to 4, so that $\ln(R_2/R_1) \approx 1$.

By including a spiral phase function in Equation (8), thereby causing polar angle $\theta = \tan^{-1}[y/x]$ variations in the pattern function, it can be shown that the pattern function retains its scale invariant and orthogonality properties. Consider a scale and rotation invariant pattern g, which has a circular harmonic phase defined by the parameter k, where parameter k is an integer. Such a function is sometimes referred to as a logarithmic radial harmonic function [LRHF], and has the form:

$$g_{mk}(r,\theta) = r^p r^{j\alpha_m} e^{jk\theta} \qquad (13)$$

The overlap integral $I_{mknl}$ of this LRHF $g_{mk}(r,\theta)$ with another similar LRHF $g_{nl}(r,\theta)$ with parameters $\alpha_n$ and k, over an annular region, is:

$$I_{mknl} = \int_{-\pi}^{+\pi} \int_{R_1}^{R_2} 2\pi r g_{mk}(r) g_{nl}^*(r) dr d\theta = \qquad (14)$$

$$2\pi \int_{-\pi}^{+\pi} e^{i(k-l)\theta} d\theta \int_{R_1}^{R_2} r^{2p+1} r^{i(\alpha_m - \alpha_n)} dr$$

As is evident from Equation (14), the overlap integral $I_{mknl}$ is simple to calculate because of the radial/tangential separability. Equation (14) can be further simplified because the tangential component integrates to a Kronecker delta function as follows:

$$\int_{-\pi}^{\pi} e^{i(k-l)\theta} d\theta = 2\pi \delta_{kl} = \begin{cases} 2\pi & , k = l \\ 0 & , k \neq l \end{cases} \qquad (15)$$

causing the overlap integral $I_{mknl}$ to simplify to $$I_{mknl} = (2\pi)^2 \frac{\delta_{kl} \left( R_2^{2p+2} R_2^{i(\alpha_m - \alpha_n)} - R_1^{2p+2} R_1^{i(\alpha_m - \alpha_n)} \right)}{2p + 2 + i(\alpha_m - \alpha_n)} \qquad (16)$$

Again, at orthogonality where $p=-1$, the magnitude squared of the overlap integral is:

$$|I_{mknl}|^2 = (4\pi)^2 \delta_{kl} \frac{\sin^2\left( \frac{1}{2} [\alpha_m - \alpha_n] \ln[R_2/R_1] \right)}{(\alpha_m - \alpha_n)^2} \qquad (17)$$

The preceding analysis refers to complex exponential functions, but in practice, images are limited to real, as well as positive, reflectivity, transmissivity, or intensity values. It can be shown that if the overlap integral $I_{mknl}$ is calculated for the real part of one LRHF $g_{mk}$ with a full complex LRHF $g_{nl}$, a magnitude squared of the overlap integral $|I_{mknl}|^2$ would be obtained that is similar to Equation (17), but reduced by a factor of four.

Therefore, the LRHF $g_{mk}$ is defined by the real value m and integer parameter k, where real value m defines in the parameter $\alpha_m$ as:

$$\alpha_m = \frac{2\pi m}{\ln[R_2/R_1]} \qquad (18)$$

In a typical application the LRHF $g_{mk}$ is evaluated over a discrete image with a finite size, and where the pixel positions (x,y) only contain discrete integer values. To avoid aliasing, constraints are imposed on the allowable values for the parameters k and $\alpha_m$.

The LRHF $g_{mk}$ has a well defined local frequency q(x,y), which is defined as the modulus of the gradient of the phase $\Psi_{mk}$ of the LRHF $g_{mk}(r)$, so $$2\pi q(x, y) = \sqrt{\left( \frac{\partial \Psi_{mk}}{\partial x} \right)^2 + \left( \frac{\partial \Psi_{mk}}{\partial y} \right)^2} \qquad (19)$$

where $$g_{mk}=|g_{mk}|\exp(i\Psi_{mk}) \quad (20)$$

Hence, from Equation (13), the phase $\Psi_{mk}$ is $$\Psi_{mk}=\alpha_m \ln r + k\theta \quad (21)$$

$$\frac{\partial \Psi_{mk}}{\partial x} = \frac{\alpha_m}{r}\frac{dr}{dx}+k\frac{d\theta}{dx} = \frac{x\alpha_m - ky}{r^2} \quad (22)$$

$$\frac{\partial \Psi_{mk}}{\partial y} = \frac{\alpha_m}{r}\frac{dr}{dx}+k\frac{d\theta}{dx} = \frac{y\alpha_m + kx}{r^2} \quad (23)$$

Substituting Equations (22) and (23) into Equation (19), local frequency q(x,y) is:

$$q(x, y) = \frac{\sqrt{\alpha_m^2 + k^2}}{2\pi r} \quad (24)$$

In other words, the radial and tangential frequencies are square additives. In fact the full 2D frequency is just the vector sum of the radial and tangential frequency vectors. It is also noted that the orientation of the local frequency q(x,y) is always fixed relative to the polar angle θ:

$$\tan\left[\frac{\partial \Psi_{mk}}{\partial y} \bigg/ \frac{\partial \Psi_{mk}}{\partial x}\right] = \tan\left[\frac{y\alpha_m + kx}{x\alpha_m - ky}\right] = \tan[\chi + \theta] \quad (25)$$

where $$\tan[\chi] = \frac{k}{\alpha_m}, \tan[\theta] = \frac{y}{x} \quad (26)$$

This property means that spirals in the LRHF $g_{mk}$ are equi-angular.

The minimum frequency $q_{min}$ for an annular LRHF $g_{mk}$ occurs at the maximum radius $R_2$ and the maximum frequency $q_{max}$ at the minimum radius $R_1$ defined respectively by:

$$q_{max} = \frac{\sqrt{\alpha_m^2 + k^2}}{2\pi R_1}, \quad q_{min} = \frac{\sqrt{\alpha_m^2 + k^2}}{2\pi R_2} \quad (27)$$

The maximum frequency $q_{max}$ is kept below the Nyquist frequency of the discrete image. FIGS. 3A and 3B show the real and imaginary parts respectively of a typical LRHF $g_{mk}$ with parameters k=50 and $\alpha_m \cong 50$.

The foregoing described the basic properties of LRHFs. However, the property of most interest in this implementation is their correlation property. Correlation at the origin has been dealt with in the overlap integral $I_{mkln}$.

In the more general case of cross-correlation and auto-correlation, a 2D-correlation function is obtained. An efficient method of correlating two large image functions is via the Fast Fourier Transform (FFT).

It is convenient to work with continuous Fourier Transforms initially, although much of the mathematics transfers directly to the discrete case with discrete Fourier transforms, with the exception of infinite frequency parts. Consider first the case of purely radial functions with complex exponent c, having the form of Equation (8), and its transform:

$$r^{-c} \Leftrightarrow q^{c-2}2^{1-c}\frac{\Gamma(1-c/2)}{\Gamma(c/2)} \quad (28)$$

Here $\Gamma()$ is the generalised factorial (gamma) function. Using partial derivatives it can be shown that LRHFs $g_{mk}$ having the form of Equation (13), have the following transform pair:

$$r^p r^{i\alpha_m} e^{ik\theta} \Leftrightarrow \mu_{mkp} q^{-p-2} q^{-i\alpha_m} e^{ik\phi} \quad (29)$$

The parameter μ is a complex constant related to the gamma function $\Gamma()$. It is noted that no coordinate scaling is necessary to estimate the form of the Fourier transform. In fact the Fourier phase is essentially the same as the spatial phase, except for a sign reversal in the radial component. This can be seen from the following:

$$\arg[r^p r^{i\alpha} e^{in\theta}]=\alpha\ln[r]+n\theta \quad (30)$$

$$\arg[\mu_{mkp}q^{-p-2}q^{-i\alpha_m}e^{ik\phi}]=\text{const}-\alpha_m\ln[q]+k\phi \quad (31)$$

One of the principle applications of correlation in image processing is in the area of template matching. Correlation is therefore used to detect the presence of a pattern, such as a LRHF $g_{mk}$, in an image $f$, where the image $f(x,y)=p(x,y)+g_{nl}(x,y)$. Correlation between pattern $g_{mk}$ and image $f$ produces a 2 dimensional image with maximum values at positions where the image $f$ best matches the pattern $g_{mk}$. The Fourier correlation theorem provides:

$$h(x,y)=f(x,y)\circledx g(x,y) \Leftrightarrow F^m(u,v)G(u,v)=H(u,v) \quad (32)$$

Thus, correlation can be implemented by Fourier transforming the image $f$ and the pattern g to obtain Fourier transformed functions F and G, complex conjugating one of the Fourier transformed functions, say F, and then multiplying these two functions $F^m$ and G, before transforming back.

It is also noted that:

$$h(x,y)=[p(x,y)+g_{nl}(x,y)]\ominus g_{ntk}(x,y)=[p(x,y)\ominus g_{ntk}(x,y)]+[g_{ntk}(x,y)\ominus g_{nl}(x,y)] \quad (33)$$

Hence, the effectiveness of the embedding and detection of pattern $g_{mk}$ in typical images depends on the cross-correlation of the original image p with the chosen pattern $g_{mk}$ being of low magnitude and widely dispersed. This is difficult to estimate however, generally, the cross-correlation part is very small compared to the auto-correlation part. The heuristic argument for this is that LRHFs do not resemble features in typical images p. The LRHFs proposed have both wide spatial support and wide spectral support.

Consider the correlation between two LRHFs $g_{mk}(r)$ and $g_{nl}(r)$, being the second term in Equation (33). The Fourier transforms of the LRHFs $g_{mk}(r)$ and $g_{nl}(r)$ are of the form:

$$g_{mk}(r)=r^p r^{i\alpha_m} e^{ik\theta} \Leftrightarrow \mu_{mkp}q^{-p-2}q^{-i\alpha_m}e^{ik\phi} \quad (34)$$

$$g_{nl}(r)=r^p r^{i\alpha_m} e^{il\theta} \Leftrightarrow \mu_{nlp}q^{-p-2}q^{-i\alpha_m}e^{il\phi} \quad (35)$$

The product of the complex conjugate of the transform of LRHF $g_{mk}(r)$ and the transform of $g_{nl}(r)$, provides:

$$H_{mknl}(u,v)=\mu_{mkp}q^{-p-2}e^{+i\alpha_m}e^{-ik\phi}\mu_{nlp}q^{-p-2}q^{i\alpha_m}e^{il\phi}=\mu_{mkp}\mu_{nlp}q^{-2p-4}q^{i(\alpha_m-\alpha_m)}e^{i(l-k)\phi} \quad (36)$$

The phases partly cancel when the two chosen LRHFs $g_{mk}(r)$ and $g_{nl}(r)$ are similar. Only when the functions are identical do the phases entirely cancel out. Phase cancellation is the classic condition for maximum correlation, although a purely linear phase component can exist and only indicates a shift in the two original functions.

In the case where the two LRHFs $g_{mk}(r)$ and $g_{nl}(r)$ are identical, Equation (36) reduces to:

$$H_{mkmk}(u,v) = (\mu_{mkp})^2 q^{-2p-4} \qquad (37)$$

In such a case the correlation peak will be of the form $$h_{mkmk}(x, y) \propto \delta(x, y), \, p = 2 \qquad (38)$$
$$\pi - \ln(r), \, p = -1$$
$$r^{2p+2}, \, p \neq 2, \, p \neq -1$$

The above equations are ideals, and the correlation peaks will be finite and discrete approximations to the ideal in practice.

However, the pattern $g_{nl}(x,y)$ is typically limited to real values only when embedding in the discrete image $f(x,y) = p(x,y) + g_{nl}(x,y)$. The discrete image $f(x,y)$ is typically further limited by only 8 bits of data per pixel, thus greyscale levels 0–255. As noted earlier, all the preceding analysis extends easily to the case where a real pattern $\Re(g_{mk})$ is embedded in an image $p(x,y)$ and detected with a complex pattern $g_{nl}$. The main difference is a 2 times increase in the noise compared to the full complex correlation, or:

$$|\Re(g_{mk}) \otimes g_{nl}| \approx \frac{|g_{mk} \otimes g_{nl}|}{2} \qquad (39)$$

Another difference is that the correlation of a pattern $g_{nl}$ with the real part of that pattern $g_{nl}$ is no longer a real power of r. Some oscillating structure will "leak" through, both radial and tangential.

The underlying mathematical method of LHRF correlation is invariant to any scale and rotation variation such that:

$$g(r,\theta) \otimes \aleph\{g(a.r,\theta+\phi)\} = [g(r,\theta) \otimes \aleph\{c.g(r,\theta)\}] \qquad (40)$$

wherein $\aleph$ defines a real or imaginary component, r is a displacement distance, $\theta$ and $\phi$ are angles, $\alpha$ is a positive real number, and c is a complex number not dependent on said displacement distance r nor said angle $\theta$.

In a similar manner functions can be defined so that the correlation is invariant to any scale variation such that:

$$g(r,\theta) \otimes \aleph\{g(a.r,\theta)\} = [g(r,\theta) \otimes \aleph\{c.g(r,\theta)\}] \qquad (41)$$

wherein c is a complex number not dependent on said displacement distance r nor said angle $\theta$.

Further functions can be defined so that the correlation is invariant to any rotation variation such that:

$$g(r,\theta) \otimes \aleph\{g(r,\theta+\phi)\} = [g(r,\theta) \otimes \aleph\{c.g(r,\theta)\}] \qquad (42)$$

wherein c is a complex number not dependent on said displacement distance r nor said angle $\theta$, and the function $g(r,\theta)$ does not necessarily have circular symmetry. In the case of circular asymmetry the relation $g(r,\theta) \neq g(r)$ holds. Many common functions and patterns with simple N-fold rotation symmetry are excluded from the above definition because they do not generally satisfy Equation (42) for all values of $\phi$; only for special values of the rotation angle $\phi = 2\pi/N$. An example of such a pattern is composed of three circles centered on the vertices of an equilateral triangle. Such a pattern has tri-fold rotational symmetry and repeats for rotation angles of $\phi = 2\pi/3$, and for all other angles Equation (42) is violated.

As noted before, the maximum frequency $q_{max}$ is kept below the Nyquist frequency of the discrete image. The maximum frequency $q_{max}$ is as defined in Equation (27), and determines the size of the 'hole' in the centre of the pattern. Similarly the size of the image introduces a maximum pattern size. In the simplest case, the pattern is restricted to an annular region defined by radii $R_1$ and $R_2$.

In addition to the conventional correlation process outlined above, and in particular Equations (36), (37) and (38), enhanced forms of correlation may also be usefully employed for the detection of embedded patterns.

One form of enhanced correlation is to boost the high frequency components of the conventional correlation. This has the effect of changing the real exponent p in Equations (37) and (38) resulting in a correlation peak which resembles the delta function in the second part of Equation (38).

Another form of enhanced correlation is known as "phase-only" correlation. Phase only correlation is implemented by taking the Fourier correlation magnitude, expressed in Equation (37) for example, and setting it to unity. This ensures that only the phase terms contribute to the overall correlation peak. Again, the peak shape tends to resemble a delta function.

A variety of enhanced correlation processes, which consist of intermediates between frequency-boosted correlation and phase-only correlation, are also possible and applicable to the correlation detection.

Roughly speaking, the ratio of the two radii $R_1$ and $R_2$ in the annulus determine the extremes of the possible scale variations before correlations fail completely. Hence, the minimum scaling factor is $R_1/R_2$ and the maximum is $R_2/R_1$. Preferably, the limits are set at 50% overlap area between an embedded pattern $g_{km}$ and a detection pattern $g_{ln}$, in which case the two scaling ratios are:

$$\sqrt{\frac{1}{2}}\sqrt{1 + \frac{1}{2\lambda^2}} \text{ and } \sqrt{\frac{1}{2}}\sqrt{1 + \frac{\lambda^2}{2}} \text{ where } \lambda = \frac{R_1}{R_2} \qquad (43)$$

The range factor in this case is $$\lambda\sqrt{\frac{2+\lambda^2}{1+2\lambda^2}} \qquad (44)$$

In a typical case, for example, where $\lambda = 4$, then the ratios are 0.72 and 2.12.

The range of scale variation may be extended by performing the correlation upon a number of differently scaled versions of the watermarked image. This allows the overlap area to be improved in at least one of the correlations. So, for example a sequence of images rescaled by progressive factors of 2 would guarantee one of the images to fit the 50% overlap criterion (for $\lambda \geq 4$), and hence give a strong correlation peak.

The foregoing described the properties of LRHFs. FIG. 4 shows a schematic diagram of a process 450 of watermarking an image 400 or document with a pattern 410, such as the real part of a LRHF $g_{mk}$ shown in FIG. 3A. The pattern 410, which may be called a watermark, is simply added to the image 400 to form a watermarked image 420. If the image 400 is in colour, then the pattern 410 is added to the luminance part of a colour image 400. This allows the watermark to survive when the watermarked image is converted from colour to a greyscale representation.

Preferably, the pattern 410 component in the watermarked image 420 is invisible or imperceptible to the human visual system under normal viewing conditions. This is done by multiplying the pattern 410 with a constant embedded factor 430, thereby adding a low intensity copy of the pattern 410 to the image 400.

A problem with embedding the low intensity copy of the pattern 410 at a sufficiently low level for it to be imperceptible to the human visual system, is that the signal levels of the low intensity copy of pattern 410 may be of a magnitude comparable to the quantisation step size used in a digital system. Consequently a simple quantisation step may lose the watermark information in a significant number of the signal samples. However, by using methods such as error diffusion, the loss of the watermark by quantisation in one sample is compensated by the increased likelihood of the watermark being represented by a nearby sample.

A collection of patterns may also be added to the image 400. FIG. 5 shows the sum of 6 shifted LRHFs, similar in form as those shown in FIG. 3A. Before patterns are added to images for watermarking, a scale is applied to their intensity, or the intensity of their sum in the case of a collection of patterns, so that their intensity is approximately of the range −5 to +5 (for example) to avoid wide intensity variation. It is noted that the intensities of the image shown in FIG. 5 has been amplified to the range 0–255 to more clearly show the patterns.

Figure 6:
FIG. 6 shows an example image with the watermark pattern of FIG. 5 embedded using the process of FIG. 4.

FIG. 6 shows the watermarked image formed by adding the watermark represented in FIG. 5 to a test image, in this case Lena. The watermark is perceptible in regions having low intensity variation, such as region 501.

In a preferred implementation, an adaptive scheme is used to reduce the level of the watermark in regions having low intensity variation and increase the level of the watermark in regions of high intensity variance. The watermark is a real function with the following general form:

$$\hat{g}_{k,m,n}(x,y) = \Re\{g(r;\theta)\} = \Re\{w_n(r;\theta) r^p r^{j\alpha_m} e^{ik\theta}\} \quad (45)$$

The window function $w_n(r,\theta)$ is a slowly varying function relatively to the pattern function $r^p r^{j\alpha_m} e^{ik\theta}$. Firstly, the window function $w_n(r,\theta)$ is used to remove or de-emphasise the high frequency central region of the pattern function $r^p r^{j\alpha_m} e^{ik\theta}$. Furthermore, the window function $w_n(r,\theta)$ is also used to reduce the pattern intensity in regions of an image to which it is applied, where the pattern would otherwise be highly visible, such as "flat" sky regions. The de-emphasis window function $w_n(r,\theta)$ may be calculated by estimating the perceptual masking in various regions of the image. An example measure of perceptual masking is local gradient magnitude of the luminance in the inage. Others include second partial derivatives of the luminance; local estimates of the "energy" or frequency content, local variance, and more sophisticated estimates of human visual system masking.

Figure 7A:
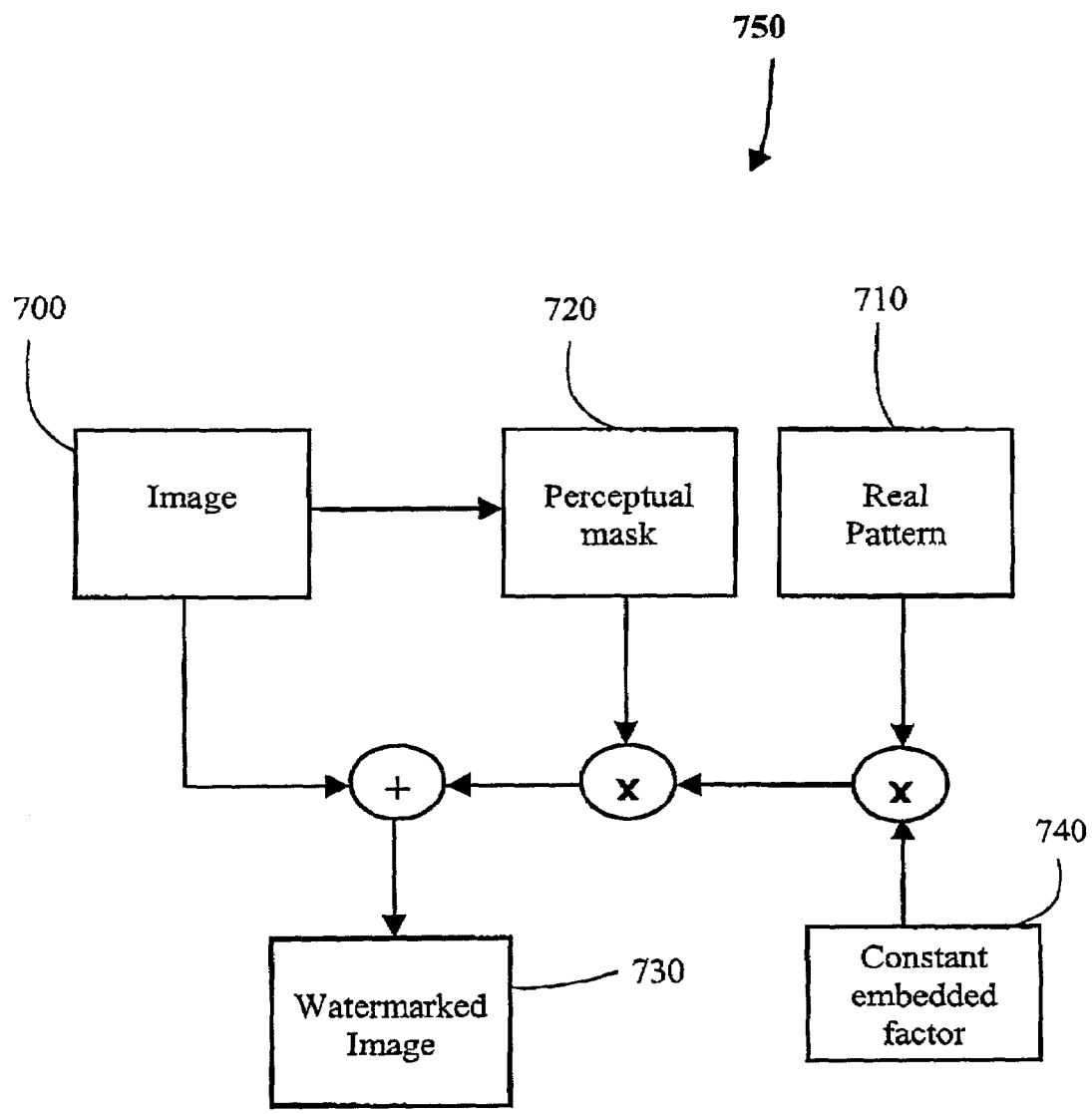
FIG. 7A shows a schematic diagram of an alternative process of watermarking an image using de-emphasis.

FIG. 7A shows a schematic diagram of an alternative process 750 of watermarking an image 700. A perceptual mask 720 is formed from the image 700. The pattern 710 with parameters k and m (or a combination of patterns) is then de-emphasised with the perceptual mask 720 by multiplying the pixel values of the perceptual mask 720 with corresponding pixel values of the pattern 710. The resulting pattern is of the form of Equation (45). This de-emphasised pattern is added to the image 700 to for a watermarked image 730.

Preferably, the pattern 710 component in the watermarked image 730 is invisible or imperceptible to the human visual system under normal viewing conditions. This is done by multiplying the pattern 710 with a constant embedded factor 740, thereby adding a low intensity copy of the pattern 710 to the image 700.

Figure 7B:
FIG. 7B shows the example image with the watermark pattern of FIG. 5 embedded using the process of FIG. 7A.

FIG. 7B shows the watermarked image formed by adding the watermark represented in FIG. 5 to the test image, using the process 750 shown in FIG. 7A. The watermark that was perceptible in region 501 of FIG. 6 is no longer perceptible in a corresponding region 502.

The window function $w_n(r,\theta)$ can also contain other information, for example a constant phase (ie complex) factor. Such a phase factor causes a constant phase offset to the pattern function $r^p r^{j\alpha_m} e^{ik\theta}$. In one implementation, this phase factor is made random, making every watermark unique, even when the same parameters $\alpha_m$ and k are used. Such a watermark would be even harder to detect.

Again, with colour images, the de-emphasised pattern $\hat{g}_{k,m,n}(x,y)$ may be added to the luminance part of the signal. Alternatively, the de-emphasised pattern $\hat{g}_{k,m,n}(x,y)$ may be added to the R, G, B, H, V, S, u, v etc channels of the colour image, or any combination thereof.

The watermark that is embedded into an image generally consists of a summation of separate basis patterns $\hat{g}$ with varying location, windows, and tuning parameters:

$$\sum_{n=1}^{N} w'_n(x-x_n, y-y_n) \cdot \hat{g}_{k(n),m(n),n}(x-x_n, y-y_n) \quad (46)$$

where window function $w'_n$ removes or de-emphasises the high frequency central region of each of the separate basis patterns $\hat{g}$.

The window function $w(x,y)$ for applying perceptual de-emphasis may be applied after the summation process, to form a watermark as follows:

$$w(x,y) \sum_{n=1}^{N} w'_n(x-x_n, y-y_n) \cdot \hat{g}_{k(n),m(n),n}(x-x_n, y-y_n) \quad (47)$$

The watermark encodes information in the centre location $(x_n, y_n)$, strength, relative phase, and parameters k(n) and $\alpha_{m(n)}$ of each of the N basis patterns $\hat{g}$. In practice the strength is not a robust carrier of information, as it can be easily attenuated, even accidentally, by any processing of the watermarked image.

Figure 8:
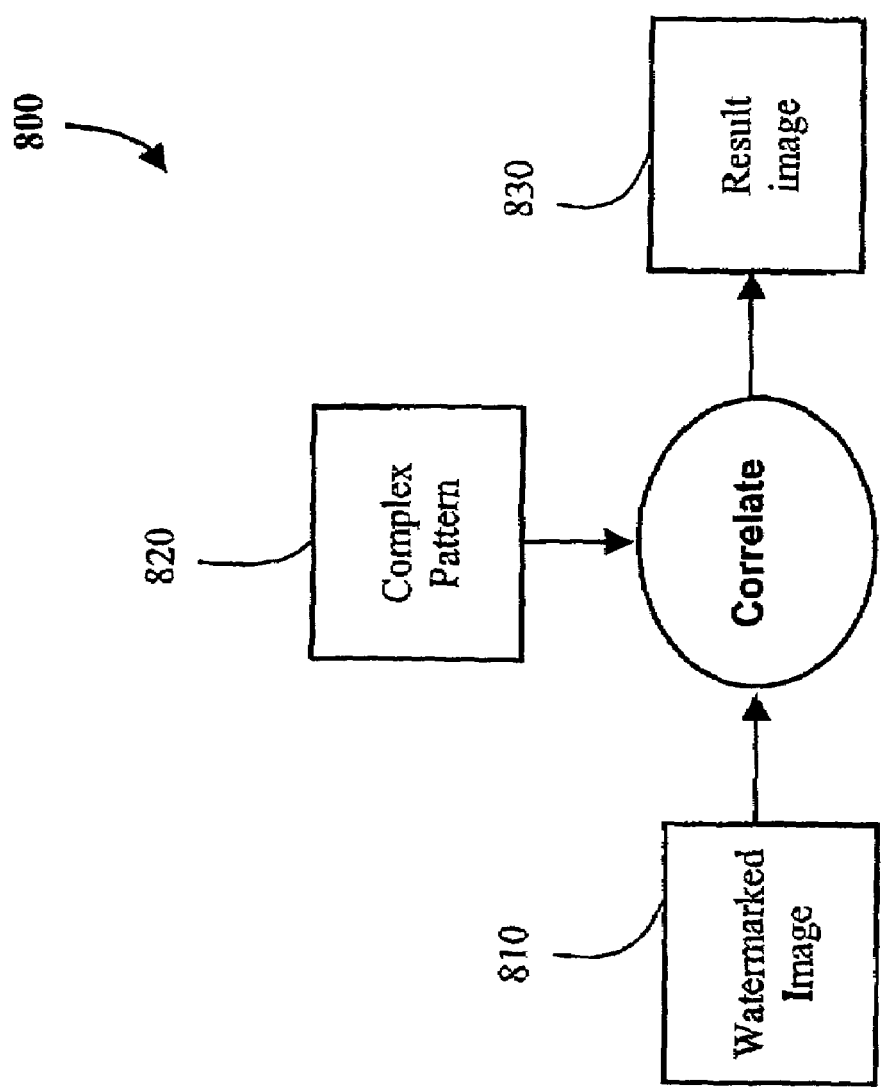
FIG. 8 shows a schematic diagram of a process of detecting a watermark in an image.

FIG. 8 shows a schematic diagram of a process 800 of detecting a watermark in a watermarked image 810. The watermarked image 810 is simply correlated with a complex pattern 820 having parameters k and $\alpha_m$, such as that shown in FIGS. 3A and 3B, to form a result image 830. Referring to Equation (33), if the complex pattern 820 is present in the watermarked image 810, in particular the real part of a LRHF having parameters k and $\alpha_m$, then the result image 830 will have correlation magnitude peak(s) at centre location(s) where that pattern 820 was embedded into the image. The use of different parameters, say l and $\alpha_n$, in the pattern 820 will result in no correlation magnitude peaks in the result image 830.

With more than one basis pattern $\hat{g}$ used in the watermark, the process 800 of detection may be repeated for each of the basis patterns $\hat{g}$.

The process 800 may also be used with watermarked images 810 where process 750 shown in FIG. 7A was used to embed the watermark 710 into the image 700, using de-emphasis of the watermark.

Figure 9:
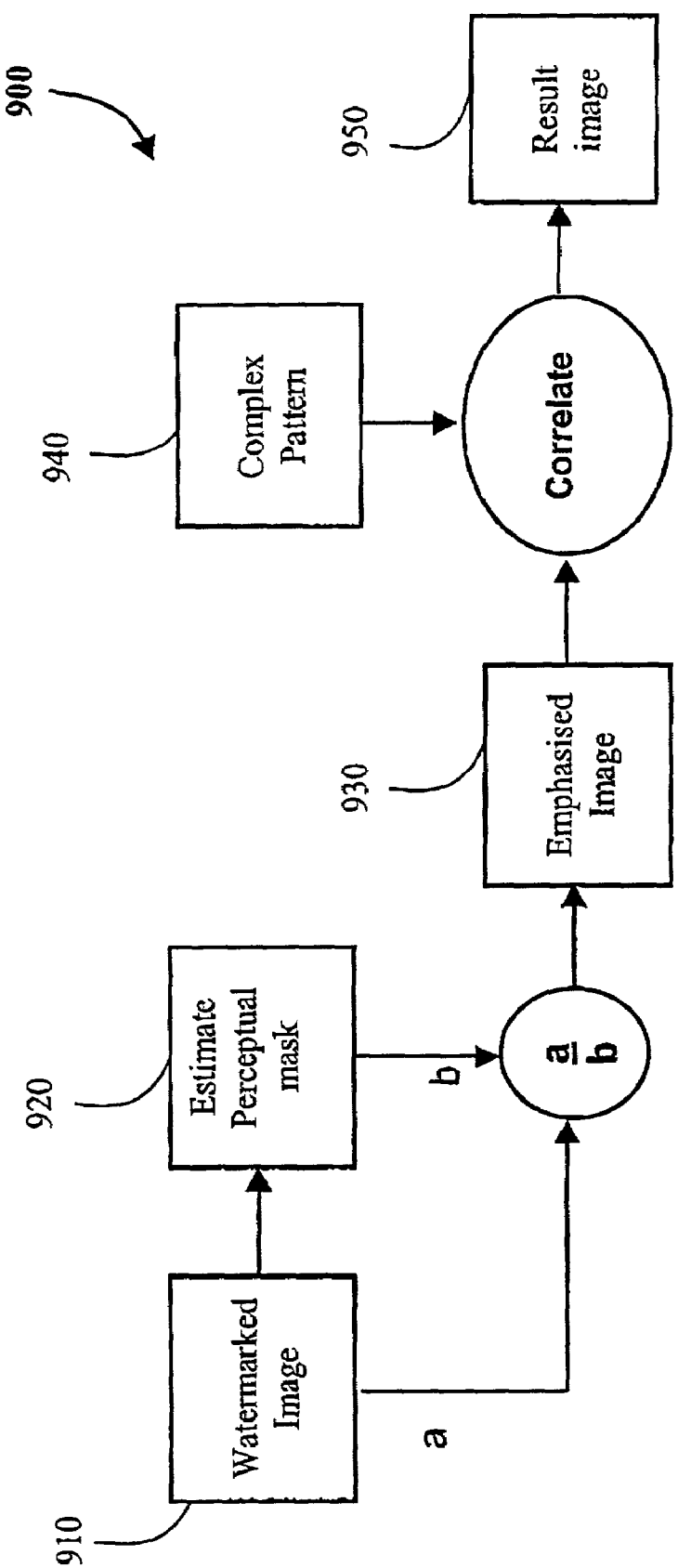
FIG. 9 shows a schematic diagram of an alternative process of detecting a watermark in an image using emphasis.

FIG. 9 shows a schematic diagram of an alternative process 900 of detecting a watermark in a watermarked image 910. A perceptual mask 920 is formed from the watermarked image 910. The watermarked image 910 is then emphasised with the perceptual mask 920 by dividing the pixel values of the watermarked image 910 by pixel values of corresponding pixel values of the perceptual mask 920. This emphasised image 930 is correlated with the complex pattern 940 to for a result image 950.

Figure 10A:
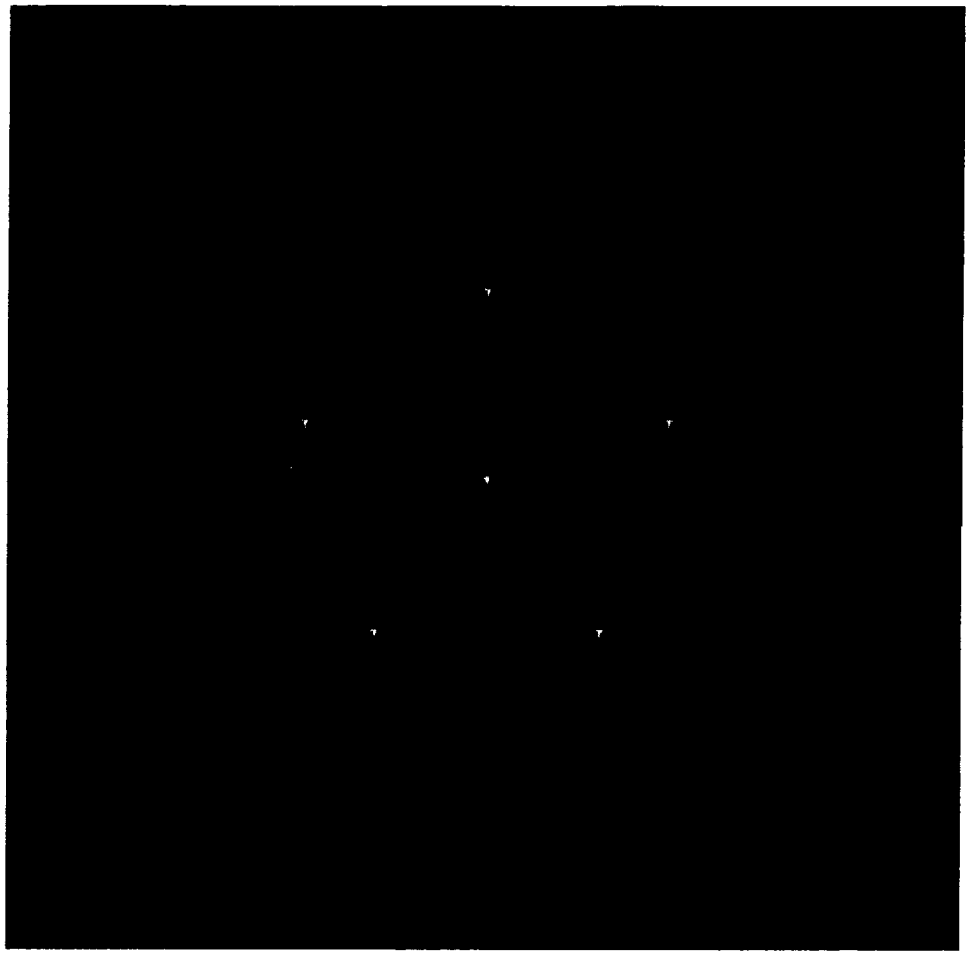
FIG. 10A shows the magnitude image of correlating the image of FIG. 6 with the correct pattern using the detection process of FIG. 8.
Figure 10B:
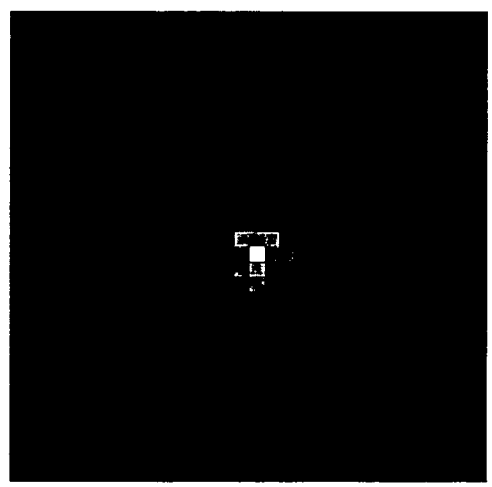
FIG. 10B shows details of one of the magnitude peaks of FIG. 10A.
Figure 11A:
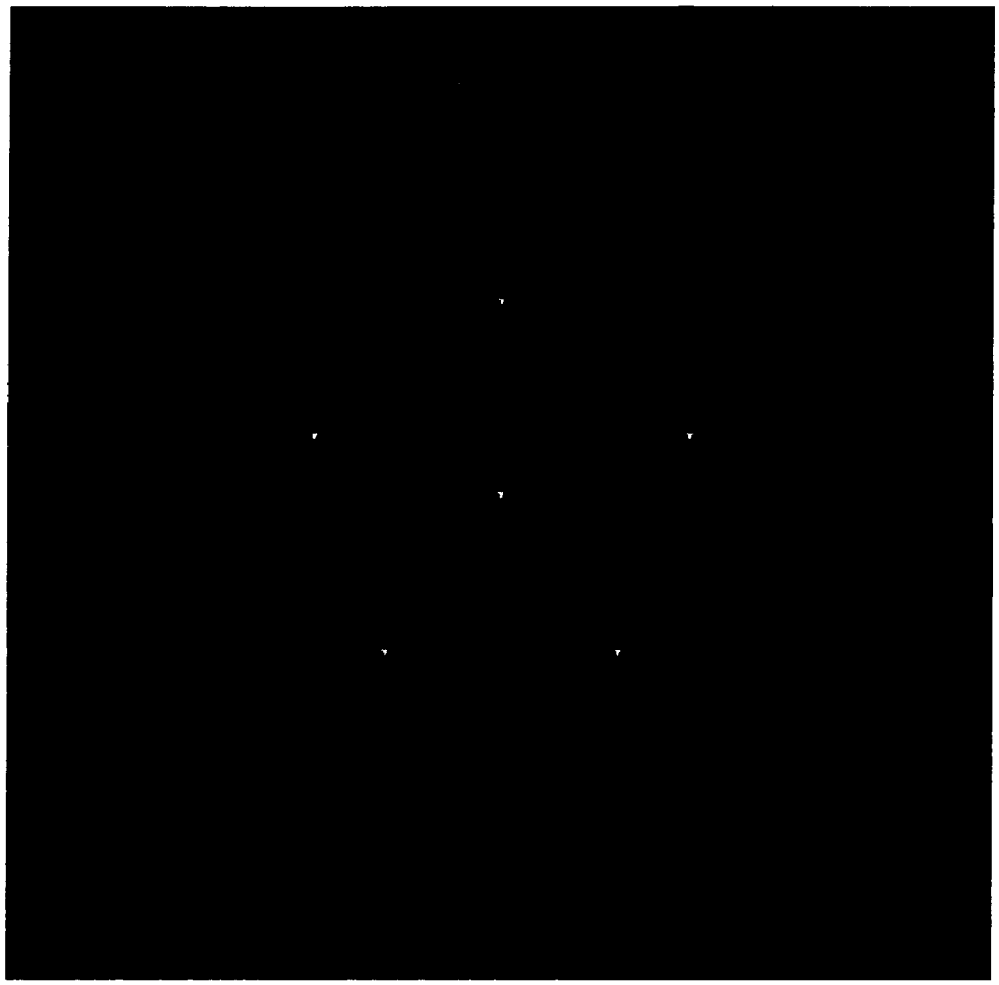
FIG. 11A shows the magnitude image of correlating the image of FIG. 7B with the correct pattern using the detection process of FIG. 9.
Figure 11B:
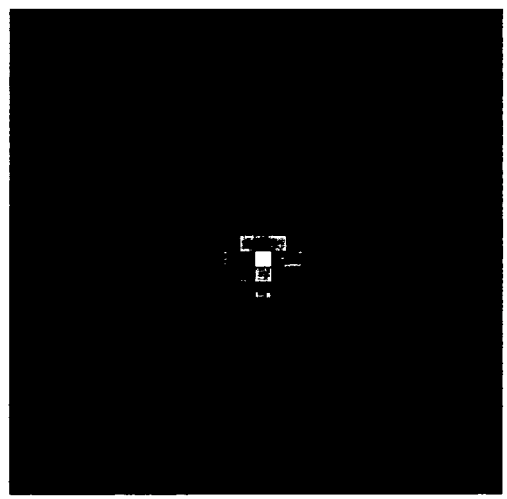
FIG. 11B shows details of one of the magnitude peaks of FIG. 11A.

FIG. 10A shows the magnitude image of the correlation of the correct LRHF $g_{mk}(r)$ with the watermarked image of FIG. 6 using process 800. FIG. 10B shows the detail of the peak structure of one of the magnitude peaks of FIG. 10A. FIG. 11A shows the magnitude image of the correlation of the correct LRHF $g_{mk}(r)$ with the watermarked image of FIG. 7B using process 900, whereas FIG. 11B shows the detail of the peak structure of one of the magnitude peaks of FIG. 11A. Note that the magnitude peaks shown in FIGS. 10B and 11B are very sharp and clear, whereas the background correlation is small. An improvement in the sharpness of the magnitude peaks is also visible in FIG. 11B. Thus, whereas the watermark process 750 using de-emphasis makes the pattern less perceptible, the watermark detection process 900 using emphasis improves detection by resulting in sharper magnitude peaks.

The magnitude peaks can only be detected by correlation with the known LRHF(s) used for embedding, or by an exhaustive search of correlation magnitude peaks by using the full range of parameters k and $\alpha_m$. The exhaustive search can be expected to be many orders of magnitude slower than detection using the correct parameters k and $\alpha_m$, making the method difficult to attack.

Figure 12:
FIG. 12 shows the example image of FIG. 6 rotated, scaled and cropped.

FIG. 12 shows the watermarked image of FIG. 7B rotated by 20 degrees and increased in size by 20%. The image has also been cropped and a gamma correction power of 0.8 has been applied. These operations were performed on the 8-bit image data using linear interpolation.

Figure 13:
FIG. 13 shows the result of correlating the image of FIG. 12 with the correct pattern using the detection process of FIG. 9.
Figure 14:
FIG. 14 shows details of one of the magnitude peaks of FIG. 13.

Performing the watermark detection process 900 shown in FIG. 9, using the correct detection LRHF $g_{mk}(r)$, the result shown in FIG. 13 is obtained. FIG. 14 shows the detail of the peak structure of one of the magnitude peaks of FIG. 13. There is some degradation of the peak structure compared to the magnitude peaks of FIG. 11B, but the correlation magnitude peaks are still well above the background noise level.

For an image containing a single magnitude peak, detection is relatively straightforward, in that the pixel containing the maximum modulus value is selected, and its coordinates define the centre of the embedded pattern.

For images containing multiple peaks to be detected, a slightly more complex approach is used. If a detection image contains s peaks, those s peaks may be detected as follows:

Find the pixel with maximum modulus among pixels in consideration. This pixel $p_i$ is one of the s pixels;

Exclude all pixels in a disk of some radius q around pixel $p_i$ from consideration; and Repeat s times in total.

The radius q is chosen depending upon the application. When alignment peaks are very well spaced, a large value for q, say 20 pixels, may be used. Peaks used to encode information may be much closer together, and a smaller value for q should be used.

The proposed processes of watermarking and detection of watermarks are inherently robust to most image distortions. These include:

Scale change from about 50% to +200%;

Any rotation;

JPEG compression down to about a 10:1 compression;

Gamma correction; and

Low pass filtering.

In addition to the above, the method is more difficult to defeat than known methods where the watermarks can be detected by analysing the Fourier magnitudes of an image. Detection of LRHF $g_{mk}(r)$ based watermarks requires many correlations, typically more than 1000, if the parameters $\alpha_m$ and k of the LRHF $g_{mk}(r)$ are unknown.

Figure 16A:
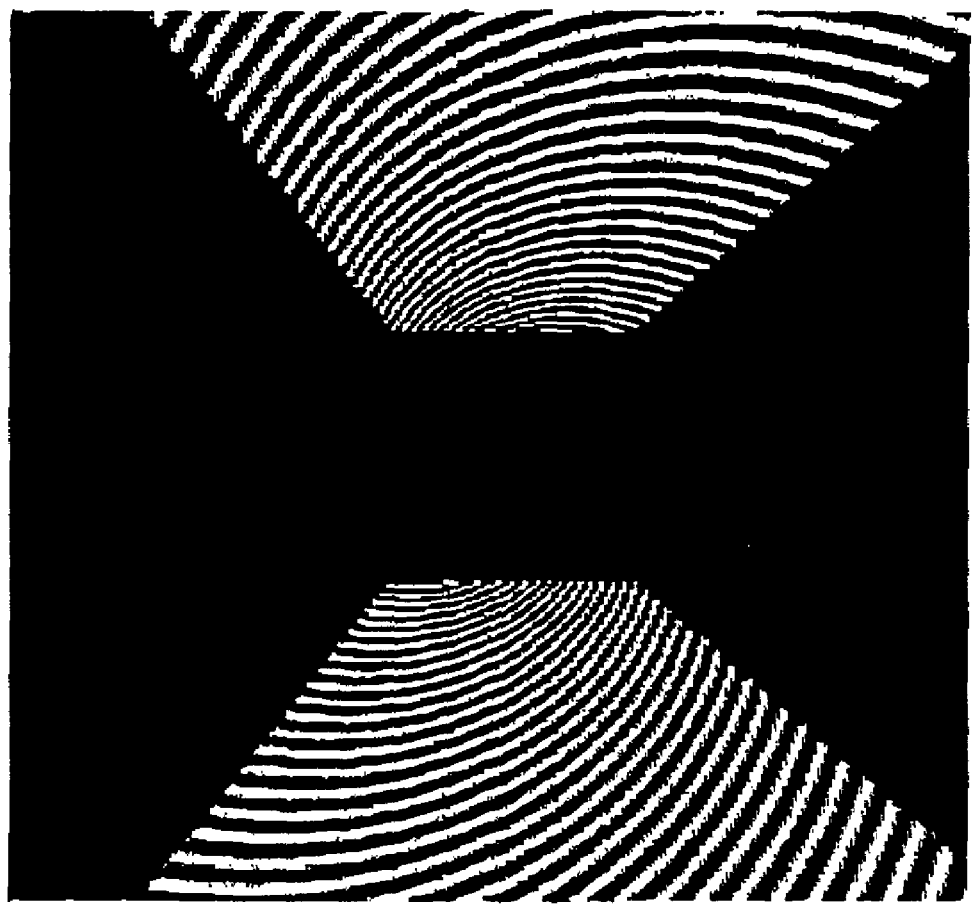
FIG. 16A shows the real part of an example a logarithmic radial phase function restricted within a subregion having an arbitrary shape.

In the forgoing the LRHF is restricted to an annular region defined by radii $R_1$ and $R_2$. However, square or other shapes may also be used to restrict the patterns. FIG. 16A shows the real part of an example a LRHF restricted within a sub-region having an trapezoidal shape. Even though the sub-region does not in itself have any rotational symmetry properties, nor is it strictly orthogonal, it is nevertheless detected effectively at any rotation angle by correlation with a full circular complex LRHF. Accordingly, either of process 800 or 900 shown in FIGS. 8 and 9 respectively may be used to detect such a pattern having an arbitrary shape. The scaling and cropping invariant properties are similarly maintained.

Figure 16B:
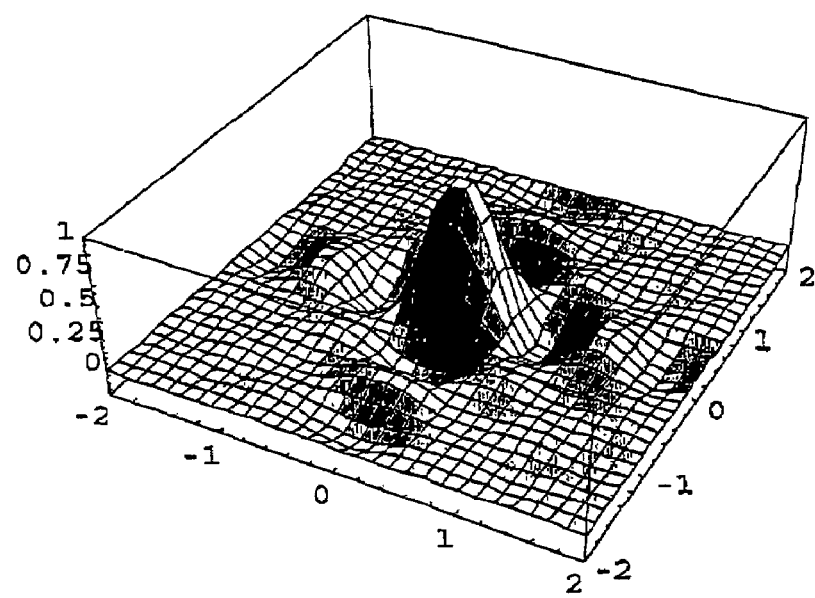
FIG. 16B shows the intensity of a correlation magnitude peak as a result of correlating a square LRHF with a circular complex LRHF.
Figure 16C:
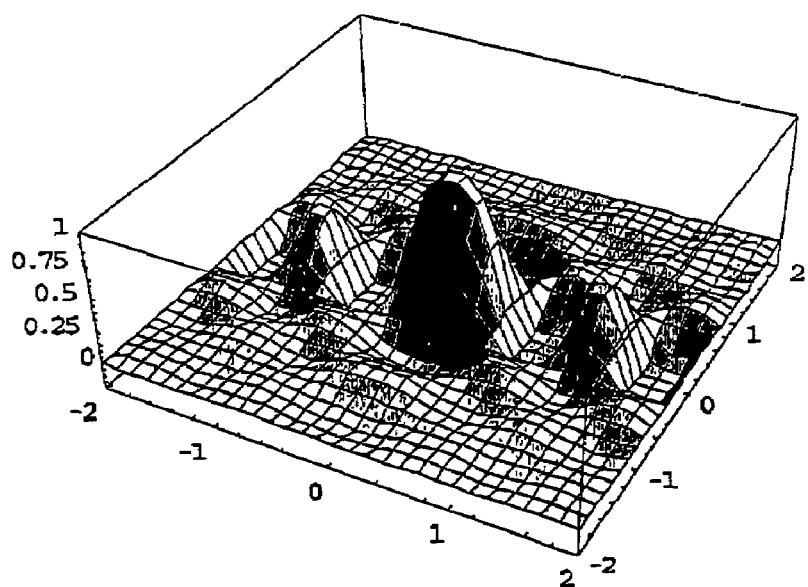
FIG. 16C shows the intensity of the correlation magnitude peak as a result of correlating the arbitrarily shaped LRHF shown in FIG. 16A with a circular complex LRHF.

FIG. 16B shows the intensity of a correlation magnitude peak as a result of correlating a square LRHF with a circular complex LRHF. This may be compared with the intensity of the correlation magnitude peak as a result of correlating the arbitrarily shaped LRHF shown in FIG. 16A with the circular complex LRHF, which is shown in FIG. 16C. It can be seen that a distinct peak is still formed which may be detected in the usual manner. The magnitude peak shown in FIG. 16C tends to be elliptical rather than circular in the specific example, with the intensity of the sidelobes being about 30% of that of peak value.

There are many applications in machine and computer vision that require registration and alignment of objects. One such an application is when a message is embedded in an image by defining a set of centre locations $(x_n, y_n)$ for basis patterns $\hat{g}$ and adding basis patterns $\hat{g}$ at selected ones of those centre locations $(x_n, y_n)$.

Watermarks based on LRHFs are particularly suited for embedding alignment marks in images to allow reliable registration and alignment of an image of, or applied to the object. Such alignment marks could take many forms. In a particular implementation, three basis patterns $\hat{g}$ are added to the image, with the basis patterns $\hat{g}$ having centre locations $(x_n, y_n)$ corresponding with the positions of three corners of a square of known size forming an 'L'-shape. The basis patterns $\hat{g}$ may be embedded visibly or invisibly using process 450 or 750 set out above.

The detection of the possibly transformed centre locations $(x_n, y_n)'$ of the alignment marks is performed by using method 800 or 900, shown in FIGS. 8 and 9 respectively. Once the alignment marks in the form of magnitude peaks in the resulting magnitude image are detected, the translation may be estimated as follows:

A rotation angle may be estimated using the vector between the two detected centre locations $(x_n, y_n)'$ or peaks which are furthest apart. Similarly, a total scaling factor may be estimated using the distance between these two peaks. A shear factor may be estimated by measuring the angle between the three peaks. A change in aspect ratio may be estimated by measuring the difference in the length of the horizontal side and the vertical side of the "L" shape formed by the three peaks. The middle point of the 'L' shape may be used to define the coordinate system origin of the alignment marks.

The four parameters (angle, scaling, shear and aspect ratio) completely define a linear transformation. Reflections and non-linear transformations such as warping or removal of image columns or rows can not be detected and therefore can not be inverted. The linear transformation may be inverted to restore the watermarked image to its original size and orientation.

Scaling and rotation may be performed by a variety of resampling algorithms. Typically a high quality resampling using bi-cubic interpolation, Fourier interpolation, or even a non-linear resampling scheme may be used.

Once the watermarked image is returned to its nominal settings, an alternative watermarking or steganographic method may be utilised to extract further information from the image.

In another implementation, the registration patterns are used in conjuction with any other watermarking technique. The registration is performed before reading the embedded watermark.

Registration may include focusing because the correlation magnitude peaks provide a nice smooth variation in magnitude with respect to changes in the focus of imaging systems. Focus can be estimated by correlation peak width. An advantage of a width based measure of focus is that it is normalised and does not depend upon the absolute peak level.

Registration may further include aspect ratio correction and shearing to some extent, due to the strength of the correlation magnitude peaks.

The above patterns used as the watermark were all radial-tangential functions having the form of Equation (45). However, patterns that only vary in one dimension may also be used, such as patterns of the following form:

$$g_m(x,y) = \Re\{w(x,y)|x|^{i\alpha_m}\} \tag{48}$$

This pattern only has variation in a x direction. Any direction could be chosen in practice. Process 450 or 750, shown in FIGS. 4 and 7 respectively, may be used to embed the pattern into an image.

The one dimensional pattern may be detected using process 800 or 900, shown in FIGS. 8 and 9 respectively, to detect the centre line position of a pattern, if the correct parameter $\alpha_m$ is known. In particular, a two-dimensional complex pattern having the form of Equation (13) is used as the pattern 820 in process 800, with the two-dimensional complex pattern having the same parameter $\alpha_m$, but zero spiral parameter k. The detection is unaffected by shear or anamorphic magnifications.

It is also possible to construct scale invariant patterns from a separable product of one dimensional patterns, thus having the form:

$$s_{l,m}(x,y) = w(x,y)|x'|^{i\alpha_l + p_x}|y'|^{i\alpha_m + p_y} \tag{49}$$

However, such patterns are not rotation invariant. It is noted that the separable directions (x',y') do not need to be orthogonal. A sequence of the above patterns may be summed to form the overall watermark. Radial harmonic patterns of the form of Equation (45) may also be added. In one implementation, the radial harmonic pattern(s) is added for registration, allowing the watermarked image to be rotated back to its original orientation, before the pattern is detected by using one of the detection processes 800 or 900.

As stated above, the watermark encodes information in the centre location $(x_n, y_n)$, strength, phase, and parameters k(n) and $\alpha_{m(n)}$ of each of the N basis patterns ĝ. For example, the location $(x_n, y_n)$ of each peak could store several bits of data. More sophisticated methods may also be used such as described below. Detection of the stored data requires that the peak and its position be identified reliably. This process may entail some error correcting or data redundancy scheme.

Using the peak localisation property, several independent watermarking basis patterns ĝ, with each basis pattern ĝ centred on a pixel in a 64×64 square grid in the image which is used for watermarking. To allow accurate extraction, each grid position is preferably separated by 7 pixels, thus the template grid pattern covers a region of 448×448 pixels in the candidate image, which is small enough to embed in all but the smallest images.

Because the detection error is usually small and typically within 1–2 pixels, a scaling factor of 50% would result in a grid spacing of 3.5 pixels, which is still reliably detectable. Any scaling to smaller dimensions could result in errors during message decoding. Scaling to increased image size could tend to enhance the reliability of detection.

This technique uses three points on a regular grid to provide information on the pattern orientation and scaling, a point to encode message length, and subsequent points to encode bits of information.

Once the embedding grid has been established, each row and column position of the marks in the original grid may be derived from the detected position of each basis embedded in the watermarked image.

The first three points define the corners of the embedding grid. A different basis pattern ĝ defines each point, thus they may be detected in order and their relative positions used to establish the orientation and scaling of the grid in the watermarked image, and sufficiently small shear or anamorphic scaling changes.

From the three corners of the grid, a linear transformation may be derived from the coordinates of the watermarked image to that of the original 64 point by 64 point grid.

The fourth point in the sequence of detected bases is used to encode the length of the encoded message in bits. By assigning numbers from 0 to 4095 to each grid position, the fourth point may indicate a message of any length from 0 to 4095 bits.

Subsequent points encode the bits of the message by concatenating the bits representing the row and column address of each point. In a 64 point by 64 point grid, each row or column address codes exactly 64 ($2^6$) separate values. Hence, each point on the 64×64 grid encodes up to 12 bits.

Modifications to this simple technique provide encoding schemes with slightly different properties.

By embedding patterns on a 64 point by 64 point grid with only a single basis pattern ĝ and B points, messages of $\lfloor \log_2(^{4096}C_{(B-3)}) \rfloor$ bits using three alignment points may be stored, where C is the binomial coefficient and ⌊⌋ is the floor operator. There are two advantages of this technique. Firstly, only a single correlation need be performed during detection, thus providing a faster detection method. Secondly, any image transformation will affect the relative phase of all detected points similarly. This provides an opportunity to encode at least one extra bit of information per basis, by comparing the complex phase of each detected peak with that of the first.

Encryption may be performed on the bitstream to hide information from persons not holding the appropriate keys.

Checksums may be added to the bitstream to provide verification of the detected watermark, and also as an aid in locating information-containing watermark patterns.

Error-correcting codes may be added to the bitstream to increase the robustness of the encoded bitstream, albeit with the requirement of embedding more basis patterns ĝ in the original watermark, perhaps making the mark more visible.

To make the embedded pattern harder to discover with malicious intent, multiple basis patterns ĝ may be added together at the same position and the sum of their detection magnitude peaks used during detection. In this case, each detection peak alone may be too small to measure, but the summation of the amplitude of all detection images will combine to produce a very well-defined peak. Only by knowing a large fraction of the multiple bases can the detection peak and hence the basis for watermarking, be found.

The process of embedding and detecting rotation and scale invariant bases has several properties, which provide the means to embed a substantial amount of information in an image watermark and recover it with great reliability. These properties include:

The amplitude peaks recovered from a watermarked image are extremely sharp and well localized, typically within 1–2 pixels. Thus their embedded position in the original image can be recovered with a great degree of accuracy.

Each watermarking basis pattern $\hat{g}$ is orthogonal to all other bases having different parameters k and $\alpha_m$. Thus, if many different basis patterns $\hat{g}$ are used in the watermark, a peak for each basis may be recovered almost independently of all other basis patterns $\hat{g}$.

If a single basis pattern $\hat{g}$ is used to embed a watermark, the magnitude peaks in the detected image will all be of identical complex phase. If multiple basis patterns $\hat{g}$ are used which differ only in complex phase, i.e. each basis pattern $\hat{g}$ is multiplied by a different complex constant of unit modulus, then the relative phase of all detected magnitude peaks will be preserved. In the best case, a single detected point may be used to determine the base phase, and the phase of subsequent magnitude peaks in the result image will retain their relative relationship to this base point.

The sharpness and amplitude of detection magnitude peaks is not substantially affected by any rotation or scaling transformations applied to the image, although the position of the magnitude peaks themselves will be rotated and scaled with the watermarked image. Thus, any rotation or scaling can be detected and corrected for by using the position of alignment points.

To a certain extent, shearing or anamorphic (aspect ratio) changes may also be detected and taken into account, thus the method is applicable to arbitrary linear transformations as long as the shear, scaling or anamorphic component is small enough.

By using iterative searching, any linear transformation to the coordinate system of a watermarked image that did not ruin its content could be detected and corrected for.

In addition to the aforementioned uses for embedded patterns, there are numerous other applications, some of which will now mentioned.

The use of a watermark allows a code to be embedded into an image. Such a code will remain with the image even if the header and other metadata of the image file are removed. This allows the code to remain strongly attached to the actual image itself. The code may be usefully employed to define the address or location of the original metadata related to the image. The metadata may contain owner identification, camera settings, geographical location, details of the subjects in the image, or any number of pieces of other information. Image metadata may be stored on the same device as the image, or on a server connected by a network, or even a server owned by a third party on the Internet.

A watermark can also embed a copyright owner's information into an image. The copyright information will be difficult to detect or remove by anyone who does not have knowledge of the parameters used to define the embedded patterns. Without the embedded pattern parameters it is necessary to search a large number of possible configurations before correlation peaks may be detected. The difficulty in searching may be sufficient to dissuade attacks upon this copyright making method.

Figure 15:
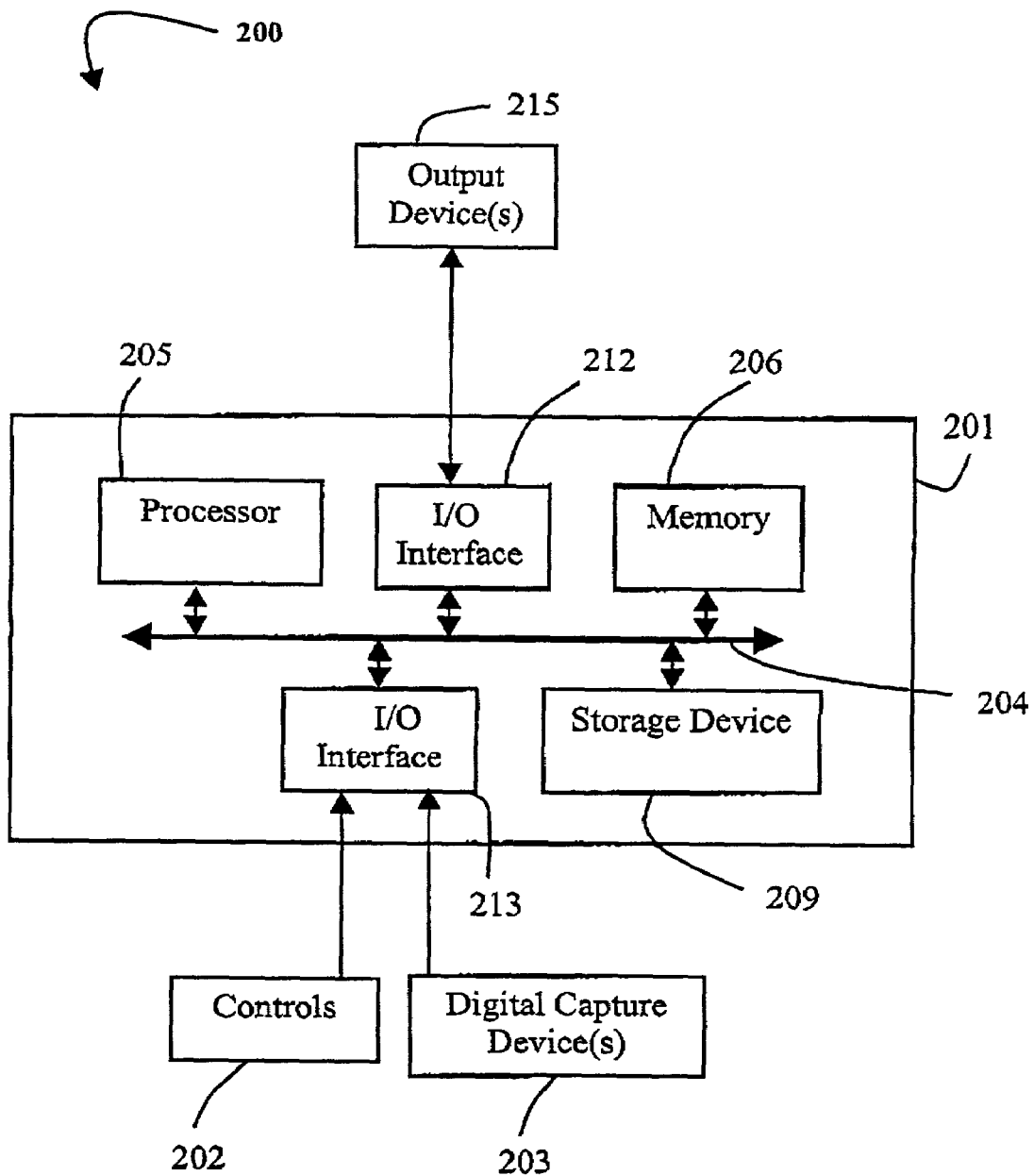
FIG. 15 shows a schematic block diagram of a system.

The processes 450, 750, 800 and 900 can be implemented on a system 200 shown in FIG. 15. In particular, one or more of the processes 450, 750, 800 and 900 may be implemented as software executing within the system 200, where the processes 450, 750, 800 and 900 are effected by instructions in the software that are carried out by the system 200. The software may be stored in a computer readable medium, including the storage devices described below, for example. The software is loaded into the system 200 from the computer readable medium, and then executed by the system 200. A computer readable medium having such software or computer program recorded on it is a computer program product. The use of the computer program product in the system 200 preferably effects an advantageous apparatus for watermarking, watermark detection or registration.

The pattern embedding and detecting processes 450, 750, 800 and 900 may be included as a plug-in module for commercially available software packages. In particular, packages which are used for the manipulation and editing of digital image files would benefit by the addition of the pattern embedding and detection software.

The embedding and/or the detection of the watermarks may be operated as a service by a third party. The images may be conveyed by a digital network for embedding and then returned to the owner with the hidden mark. Similarly an image thought to contain a mark may be submitted to the third party operator for detection of marks with specified parameters.

Libraries of digital images could incorporate embedded patterns to maintain connections with image metadata and also to maintain image copyright information.

Digital cameras, whether still or video would benefit from the inclusion of pattern embedding software and/or software to allow embedding of information immediately following image acquisition. The advantage in such a system is that unmarked images would be difficult or impossible to obtain.

The system 200 may, for example, be a general-purpose computer, a digital camera, a video camera, a scanner or a photocopier. The system 200 comprises a computer module 201, output device(s) 215 and input devices such as controls 202 and digital capture device 203. The digital capture device 203 may be an image sensor, such a two-dimensional CCD array. The computer module 201 typically includes at least one processor unit 205, a memory unit 206, for example formed from semiconductor random access memory (RAM) and read only memory (ROM), input/output (I/O) interface(s) and a storage device 209. The components 205 to 213 of the computer module 201, typically communicate via an interconnected bus 204 and in a manner which results in a conventional mode of operation of the computer system 200 known to those in the relevant art In the case where the system 200 is a general-purpose computer, the output device 215 includes a display device. A printer may also be provided. The controls 202 include a keyboard and a mouse. The storage device 209 typically includes a hard disk drive, a floppy disk drive and a CD-ROM drive. Typically, the application program is resident on the storage device 209, and read and controlled in its execution by the processor 205. Intermediate storage of the program may be accomplished using the semiconductor memory 206, possibly in concert with the storage device 209. In some instances, the application program may be supplied to the user encoded on a CD-ROM or floppy disk and read via a CD-ROM drive or floppy disk drive 211, or alternatively may be read by the user from a network (not illustrated). Still further, the software can also be loaded into the computer system 200 from other computer readable medium including magnetic tape, a ROM or integrated circuit, a magneto-optical disk, a radio or infra-red transmission channel between the computer module 201 and another device, a computer readable card such as a PCMCIA card, and the Internet and Intranets including e-mail transmissions and information recorded on websites and the like. The foregoing is merely exemplary of relevant computer readable mediums. Other computer readable mediums may be practiced without departing from the scope and spirit of the invention.In the case where the system 200 is a digital camera or video camera, the image(s) and/or the watermarked image(s) may be stored onto the storage device 209 or communicated to another device (not illustrated).

One or more of the processes 450, 750, 800 and 900 may alternatively be implemented in dedicated hardware such as one or more integrated circuits performing the functions or sub functions of those processes 450, 750, 800 and 900. Such dedicated hardware may include graphic processors, digital signal processors, or one or more microprocessors and associated memories.

Thus, images may be obtained by the system 200 using the digital capture device(s) 202 or through the storage device 209. Watermarked images may be displayed, printed, stored or communicated to other devices. Similarly, watermarked images may be obtained by the system 200 using the digital capture device(s) 202 or through the storage device 209.

Before the watermarked image is displayed, printed or stored as a greyscale image on a medium which has a finite dynamic range and resolution, such as a bitmap file, liquid crystal display or a laser-printer output, the watermarked image is converted to a quantised facsimile or a halftone representation.

In another implementation, the digital capture device 203 is an audio device, and the system 200 is used to embed watermarks of the form:

$$g_m(t)=|t|^{j\alpha_m+p} \quad (50)$$

into audio streams, where t is a time in the audio stream.

Audio signals whether digital or (high quality) analogue may have very low level patterns or signals added with very little differences being perceptible. If the signal length is long enough, then a strong correlation peak is obtainable provided the pattern parameters are known. In this way information (copyright or otherwise) may be embedded in the audio signal. The embedding device, which may be software or hardware, may be located near the input of an audio capture device, such as a microphone. Alternatively the embedding process may take place near the output device of an audio production system. In this case the embedded patterns would be optimised for the final output medium, such as Compact Disc or Digital Audio Tape. The patterns would survive and still be detectable after sophisticated watermark attacks such as pitch changing and resampling because of the scale invariant property.

In yet another implementation, the correlation is performed optically through the use of spatial light modulators.

The foregoing describes only some implementations, and modifications and/or changes can be made thereto without departing from the scope and spirit of the invention, the implementation(s) being illustrative and not restrictive.

We claim:

1. A method of embedding a watermark into an image, said method comprising the step of:

maintaining at least one basis pattern; and adding said basis pattern(s) to said image, said basis pattern(s) being formed substantially from a basis function, wherein said basis function is defined such that said basis function when correlated with a scaled and rotated version of said basis function is substantially equal to the auto-correlation of said function within a complex multiplicative constant.

2. A method as claimed in claim 1, wherein said at least one basis pattern is a real function—substantially formed from said basis function.

3. A method as claimed I,in n claim 1, wherein said basis function is a function $g(r,\theta)$ defined such that:

$$g(r,\theta) \otimes g(a.r,\theta+\phi) = c.[g(r,\theta) \otimes g(r,\theta)]$$

wherein r is a displacement distance, $\theta$ and $\phi$ are angles, a is a positive real number, and c is a complex number not dependent on said displacement distance r nor said angle $\theta$.

4. A method as claimed in claim 1, wherein said basis function is a function $g(r,\theta)$ further defined such that:

$$g(r,\theta) \otimes \aleph\{g(a.r,\theta+\phi)\} = [g(r,\theta) \otimes \aleph\{c.g(r,\theta)\}]$$

wherein $\aleph$ defines a real or imaginary component, r is a displacement distance, $\theta$ and $\phi$ are angles, a is a positive real number, and c is a complex number not dependent on said displacement distance r nor said angle $\theta$.

5. A method as claimed in claim 1, wherein said basis function is of the form:

$$g_{pmk}(r,\theta) = r^{j\alpha_m+p} e^{ik\theta},$$

with k, p and $\alpha_m$ being parameters of said basis function.

6. A method as claimed in claim 5, wherein at least a first and a second basis patterns are added to said image, with said first and second basis patterns formed from a first and a second basis function respectively, and with at least one parameter k or $\alpha_m$ of said first basis function being different to that of said second basis function.

7. A method as claimed in claim 5, wherein a plurality of basis patterns are added with different offsets relative to a center of said image.

8. A method as claimed in claim 7 comprising the further initial step of encoding information into at least one of said parameters, said offset, an amplitude or a relative phase added to said basis pattern.

9. A method as claimed in claim 1, wherein said basis pattern is of the form:

$$g_{pmkn}(r,\theta) = \Re\{w_n(r,\theta).r^{j\alpha_m+p}e^{ik\theta}\}$$

with k, p and $\alpha_m$ being parameters of said basis function, and $w_n(r,\theta)$ is a window function.

10. A method as claimed in claim 9 wherein said window function $w_n(r,\theta)$ removes or de-emphasises a central region of said basis function having frequencies above a predetermined frequency.

11. A method as claimed in claim 9 wherein said window function $w_n(r,\theta)$ de-emphasises regions of said basis function corresponding with regions of said image having a low signal variation.

12. A method as claimed in claim 9 wherein said window function $w_n(r,\theta)$ contains a constant phase factor.

13. A method of embedding a watermark into an image, said method comprising the step of:

maintaining at least one basis pattern; and adding said basis pattern(s) to said image, wherein said basis pattern(s) is formed substantially from a real component of a basis function, said basis function being of the form:

$$s_{l,m}(x,y)=w(x,y)|x'|^{j\alpha_l+p_x}|y'|^{j\alpha_m+p_y},$$

wherein $p_x$, $p_y$, and $\alpha_m$ are parameters of said basis function, w(x,y) is a window function, and x' and y' are predetermined co-ordinates which are rotated relative to the Cartesian co-ordinates x and y.

14. A method of embedding a watermark into an image, said method comprising the step of:
   maintaining at least one basis pattern; and
   adding said basis pattern(s) to said image, said basis pattern(s) being formed substantially from a basis function, wherein said basis function is defined such that said basis function when correlated with a scaled version of said basis function is substantially equal to the auto-correlation of said function within a complex multiplicative constant.

15. A method as claimed in claim 14, wherein said basis pattern(s) is a real function—substantially formed from said basis function.

16. A method as claimed in claim 14, wherein said basis function is a function $g(r,\theta)$ defined such that:

$$g(r,\theta)\otimes g(a.r,\theta)=c.[g(r,\theta)\otimes g(r,\theta)]$$

wherein r is a displacement distance, $\theta$ is an angle, a is a positive real number, and c is a complex number not dependent on said displacement distance r nor said angle $\theta$.

17. A method as claimed in claim 14, wherein said basis function is a function $g(r,\theta)$ further defined such that:

$$g(r,\theta)\otimes\aleph\{g(a.r,\theta)\}=[g(r,\theta)\otimes\aleph\{c.g(r,\theta)\}]$$

wherein $\aleph$ defines a real or imaginary component, r is a displacement distance, $\theta$ is an angle, a is a positive real number, and c is a complex number not dependent on said displacement distance r nor said angle $\theta$.

18. A method of embedding a watermark into an image, said method comprising the step of:
   maintaining at least one basis pattern; and
   adding said basis pattern(s) to said image, said basis pattern(s) being formed substantially from a basis function, wherein said basis function is defined such that said basis function when correlated with a rotated version of said basis function is substantially equal to the auto-correlation of said function within a complex multiplicative constant.

19. A method as claimed in claim 18, wherein said basis pattern(s) is a real function—substantially formed from said basis function.

20. A method as claimed in claim 18, wherein said basis function is a function $g(r,\theta)$ defined such that:

$$g(r,\theta)\otimes g(r,\theta+\phi)=c.[g(r,\theta)\otimes g(r,\theta)]$$

wherein r is a displacement distance, $\theta$ and $\phi$ are angles, and c is a complex number not dependent on said displacement distance r nor said angle $\theta$.

21. A method as claimed in claim 18, wherein said basis function is a function $g(r,\theta)$ further defined such that:

$$g(r,\theta)\otimes\aleph\{g(r,\theta+\phi)\}=[g(r,\theta)\otimes\aleph\{c.g(r,\theta)\}]$$

wherein $\aleph$ defines a real or imaginary component, r is a displacement distance, $\theta$ and $\phi$ are angles, and c is a complex number not dependent on said displacement distance r nor said angle $\theta$.

22. A method of detecting a watermark from an image, said watermark having a first basis pattern embedded, said method comprising the steps of:
   maintaining a second basis pattern; and
   detecting said first basis pattern in said image using said second basis pattern, said first and second basis patterns being formed substantially from a basis function, wherein said basis function is defined such that said basis function when correlated with a scaled and rotated version of said basis function is substantially equal to the auto-correlation of said function within a complex multiplicative constant.

23. A method as claimed in claim 22, wherein said first basis pattern is a real function—substantially formed from said basis function.

24. A method as claimed in claim 22, wherein said basis function is a function $g(r,\theta)$ defined such that:

$$g(r,\theta)\otimes g(a.r,\theta+\phi)=c.[g(r,\theta)\otimes g(r,\theta)]$$

wherein r is a displacement distance, $\theta$ and $\phi$ are angles, a is a positive real number, and c is a complex number not dependent on said displacement distance r nor said angle $\theta$.

25. A method as claimed in claim 22, wherein said basis function is a function $g(r,\theta)$ such that:

$$g(r,\theta)\otimes\aleph\{g(a.r,\theta+\phi)\}=[g(r,\theta)\otimes\aleph\{c.g(r,\theta)\}]$$

wherein $\aleph$ defines a real or imaginary component, r is a displacement distance, $\theta$ and $\phi$ are angles, a is a positive real number, and c is a complex number not dependent on said displacement distance r nor said angle $\theta$.

26. A method as claimed in claim 22, wherein said basis function is of the form:

$$g_{pmk}(r,\theta)=r^{j\alpha_m+p}e^{ik\theta},$$

with k, p and $\alpha_m$ being parameters of said basis function.

27. A method as claimed in claim 22, wherein said first basis pattern is of the form:

$$g_{pmkn}(r,\theta)=\Re\{w_n(r,\theta).r^{j\alpha_m+p}e^{ik\theta}\}$$

with k, p and $\alpha_m$ being parameters of said basis function, and $w_n(r,\theta)$ is a window function.

28. A method as claimed in claim 22, wherein said detection step comprises the steps of:
   correlating said image with said second pattern to form a correlation image; and
   locating at least one magnitude peak in said correlation image, said peak corresponding to a centre position where said first basis pattern was embedded into said image.

29. A method as claimed in claim 28, comprising the further final step of decoding information from at least one of said peak position(s), an amplitude or relative phase of said peak(s).

30. A method as claimed in claim 28, comprising the farther initial step of de-emphasising regions of said image having high signal variation.

31. A method of adding registration marks to an image, said method comprising the step of:
   maintaining at least one basis pattern, said basis pattern(s) being formed substantially from a basis function, wherein said basis function is defined such that said basis function when correlated with a scaled and rotated version of said basis function is substantially equal to the auto-correlation of said function within a complex multiplicative constant;
   adding said basis pattern(s) to said image at at least three predetermined offsets relative to a center of said image.

32. A method as claimed in claim 31, wherein said at least one basis pattern is a real function—substantially formed from said basis function.

33. A method as claimed in claim 31 wherein said basis function is a function g(r,θ) defined such that:

$$g(r,\theta) \otimes g(a.r,\theta+\phi) = c.[g(r,\theta) \otimes g(r,\theta)]$$

wherein r is a displacement distance, θ and φ are angles, a is a positive real number, and c is a complex number not dependent on said displacement distance r nor said angle θ.

34. A method as claimed in claim 31, wherein said basis function is a function g(r,θ) defined such that:

$$g(r,\theta) \otimes \aleph\{g(a.r,\theta+\phi)\} = [g(r,\theta) \otimes \aleph\{c.g(r,\theta)\}]$$

wherein $\aleph$ defines a real or imaginary component, r is a displacement distance, θ and φ are angles, a is a positive real number, and c is a complex number not dependent on said displacement distance r nor said angle θ.

35. A method as claimed in claim 31, wherein said basis function is of the form:

$$g_{pmk}(r,\theta) = r^{j\alpha_m + p} e^{ik\theta},$$

with k, p and $\alpha_m$ being parameters of said basis function.

36. A method of registering a transformed image, wherein a first basis pattern is embedded in said image before transformation at at least three predetermined positions, said method comprising the steps of:
  maintaining a second basis pattern;
  detecting said first basis pattern in said transformed image using said second basis pattern, said first and second basis patterns being formed substantially from a basis function, wherein said basis function is defined such that said basis function when correlated with a scaled and rotated version of said basis function is substantially equal to the auto-correlation of said function within a complex multiplicative constant;
  comparing positions of said first pattern with said predetermined positions;
  determining linear transformations for transforming said positions of said first pattern with said predetermined positions; and
  transforming said image to invert said linear transformations.

37. A method as claimed in claim 36, wherein said first basis pattern is a real function—substantially formed from said basis function.

38. A method as claimed in claim 36, wherein said basis function is a function g(r,θ) defined such that:

$$g(r,\theta) \otimes g(a.r,\theta+\phi) = c.[g(r,\theta) \otimes g(r,\theta)]$$

wherein r is a displacement distance, θ and φ are angles, a is a positive real number, and c is a complex number not dependent on said displacement distance r nor said angle θ.

39. A method as claimed in claim 36, wherein said basis function is a function g(r,θ) defined such that:

$$g(r,\theta) \otimes \aleph g(a.r,\theta+\phi)\} = [g(r,\theta) \otimes \aleph\{c.g(r,\theta)\}]$$

wherein $\aleph$ defines a real or imaginary component, r is a displacement distance, θ and φ are angles, a is a positive real number, and c is a complex number not dependent on said displacement distance r nor said angle θ.

40. A method as claimed in claim 36, wherein said basis function is of the form:

$$g_{pmk}(r,\theta) = r^{j\alpha_m + p} e^{ik\theta},$$

with k, p and $\alpha_m$ being parameters of said basis function.

41. A method as claimed in claim 36, wherein said first basis pattern is of the form:

$$g_{pmkn}(r,\theta) = \Re\{w_n(r,\theta) r^{j\alpha_m + p} e^{ik\theta}\}$$

with k, p and $\alpha_m$ being parameters of said basis function, and $w_n(r,\theta)$ is a window function.

42. A method as claimed in claim 36, wherein said detection step comprises the steps of:
  correlating said transformed image with said second pattern to form a correlation image; and
  locating at least three magnitude peaks in said correlation image, said peaks determining the positions of said first basis pattern in said transformed image.

43. An image processing apparatus for embedding a watermark into an image, said apparatus comprising:
  means for maintaining at least one basis pattern; and
  means for adding said basis pattern(s) to said image, said basis pattern(s) being formed substantially from a basis function, wherein said basis function is defined such that said basis function when correlated with a scaled and rotated version of said basis function is substantially equal to the auto-correlation of said function within a complex multiplicative constant.

44. An apparatus as claimed in claim 43, wherein said at least one basis pattern is a real function—substantially formed from said basis function.

45. An apparatus as claimed in claim 43, wherein said basis function is a function g(r,θ) defined such that:

$$g(r,\theta) \otimes g(a.r,\theta+\phi) = c.[g(r,\theta) \otimes g(r,\theta)]$$

wherein r is a displacement distance, θ and φ are angles, a is a positive real number, and c is a complex number not dependent on said displacement distance r nor said angle θ.

46. An apparatus as claimed in claim 43, wherein said basis function is a function g(r,θ) further defined such that:

$$g(r,\theta) \otimes \aleph\{g(a.r,\theta+\phi)\} = [g(r,\theta) \otimes \aleph\{c.g(r,\theta)\}]$$

wherein $\aleph$ defines a real or imaginary component, r is a displacement distance, θ and φ are angles, a is a positive real number, and c is a complex number not dependent on said displacement distance r nor said angle θ.

47. An apparatus as claimed in claim 43, wherein said basis function is of the form:

$$g_{pmk}(r,\theta) = r^{j\alpha_m + p} e^{ik\theta},$$

with k, p and $\alpha_m$ being parameters of said basis function.

48. An apparatus as claimed in claim 47, wherein at least a first and a second basis patterns are added to said image, with said first and second basis patterns formed from a first and a second basis function respectively, and with at least one parameter k or $\alpha_m$ of said first basis function being different to that of said second basis function.

49. An apparatus as claimed in claim 47, wherein a plurality of basis patterns are added with different offsets relative to a center of said image.

50. An apparatus as claimed in claim 49 further comprising means for encoding information into at least one of said parameters, said offset, an amplitude or a relative phase added to said basis pattern.

51. An apparatus as claimed in claim 43, wherein said basis pattern is of the form:

$$g_{pmkn}(r,\theta) = \Re\{w_n(r,\theta). r^{j\alpha_m + p} e^{ik\theta}\}$$

with k, p and $\alpha_m$ being parameters of said basis function, and $w_n(r,\theta)$ is a window function.

52. An apparatus as claimed in claim 51 wherein said window function $w_n(r,\theta)$ removes or de-emphasises a central region of said basis function having frequencies above a predetermined frequency.

53. An apparatus as claimed in claim 51 wherein said window function $w_n(r,\theta)$ de-emphasises regions of said basis function corresponding with regions of said image having a low signal variation.

54. An apparatus as claimed in claim 51 wherein said window function $w_n(r,\theta)$ contains a constant phase factor.

55. An image processing apparatus for embedding a watermark into an image, said apparatus comprising:
means for maintaining at least one basis pattern; and
means for adding said basis pattern(s) to said image, wherein said basis pattern(s) is formed substantially from a real component of a basis function, said basis function being of the form:

$$s_{l,m}(x,y) = w(x,y)|x'|^{j\alpha_l + p_x}|y'|^{j\alpha_m + p_y},$$

wherein $p_x$, $p_y$, $\alpha_l$ and $\alpha_m$ are parameters of said basis function, $w(x,y)$ is a window function, and x' and y' are predetermined co-ordinates which are rotated relative to the Cartesian co-ordinates x and y.

56. An image processing apparatus for embedding a watermark into an image, said apparatus comprising:
means for maintaining at least one basis pattern; and
means for adding said basis pattern(s) to said image, said basis pattern(s) being formed substantially from a basis function, wherein said basis function is defined such that said basis function when correlated with a scaled version of said basis function is substantially equal to the auto-correlation of said function within a complex multiplicative constant.

57. An apparatus as claimed in claim 56, wherein said basis pattern(s) is a real function—substantially formed from said basis function.

58. An apparatus as claimed in claim 56, wherein said basis function is a function $g(r,\theta)$ defined such that:

$$g(r,\theta) \otimes g(a.r,\theta) = c.[g(r,\theta) \otimes g(r,\theta)]$$

wherein r is a displacement distance, $\theta$ is an angle, a is a positive real number, and c is a complex number not dependent on said displacement distance r nor said angle $\theta$.

59. An apparatus as claimed in claim 56, wherein said basis function is a function $g(r,\theta)$ further defined such that:

$$g(r,\theta) \otimes \aleph\{g(a.r,\theta)\} = [g(r,\theta) \otimes \aleph\{c.g(r,\theta)\}]$$

wherein $\aleph$ defines a real or imaginary component, r is a displacement distance, $\theta$ is an angle, a is a positive real number, and c is a complex number not dependent on said displacement distance r nor said angle $\theta$.

60. An image processing apparatus for embedding a watermark into an image, said apparatus comprising:
means for maintaining at least one basis pattern; and
means for adding said basis pattern(s) to said image, said basis pattern(s) being formed substantially from a basis function, wherein said basis function is defined such that said basis function when correlated with a rotated version of said basis function is substantially equal to the auto-correlation of said function within a complex multiplicative constant.

61. An apparatus as claimed in claim 60, wherein said basis pattern(s) is a real function—substantially formed from said basis function.

62. An apparatus as claimed in claim 60, wherein said basis function is a function $g(r,\theta)$ defined such that:

$$g(r,\theta) \otimes g(r,\theta+\phi) = c.[g(r,\theta) \otimes g(r,\theta)]$$

wherein r is a displacement distance, $\theta$ and $\phi$ are angles, and c is a complex number not dependent on said displacement distance r nor said angle $\theta$.

63. An apparatus as claimed in claim 60, wherein said basis function is a function $g(r,\theta)$ further defined such that:

$$g(r,\theta) \otimes \aleph\{g(r,\theta+\phi)\} = [g(r,\theta) \otimes \aleph\{c.g(r,\theta)\}]$$

wherein $\aleph$ defines a real or imaginary component, r is a displacement distance, $\theta$ and $\phi$ are angles, and c is a complex number not dependent on said displacement distance r nor said angle $\theta$.

64. An image processing apparatus for detecting a watermark from an image, said watermark having a first basis pattern embedded, said apparatus comprising:
means for maintaining a second basis pattern; and
means for detecting said first basis pattern in said image using said second basis pattern, said first and second basis patterns being formed substantially from a basis function, wherein said basis function is defined such that said basis function when correlated with a scaled and rotated version of said basis function is substantially equal to the auto-correlation of said function within a complex multiplicative constant.

65. An apparatus as claimed in claim 64, wherein said first basis pattern is a real function—substantially formed from said basis function.

66. An apparatus as claimed in claim 64, wherein said basis function is a function $g(r,\theta)$ defined such that:

$$g(r,\theta) \otimes g(a.r,\theta+\phi) = c.[g(r,\theta) \otimes g(r,\theta)]$$

wherein r is a displacement distance, $\theta$ and $\phi$ are angles, a is a positive real number, and c is a complex number not dependent on said displacement distance r nor said angle $\theta$.

67. An apparatus as claimed in claim 64, wherein said basis function is a function $g(r,\theta)$ defined such that:

$$g(r,\theta) \otimes \aleph\{g(a.r,\theta+\phi)\} = [g(r,\theta) \otimes \aleph\{c.g(r,\theta)\}]$$

wherein $\aleph$ defines a real or imaginary component, r is a displacement distance, $\theta$ and $\phi$ are angles, a is a positive real number, and c is a complex number not dependent on said displacement distance r nor said angle $\theta$.

68. An apparatus as claimed in claim 64, wherein said basis function is of the form:

$$g_{pmk}(r,\theta) = r^{j\alpha_m + p} e^{ik\theta},$$

with k, p and $\alpha_m$ being parameters of said basis function.

69. An apparatus as claimed in claim 64, wherein said first basis pattern is of the form:

$$g_{pmkn}(r,\theta) = \Re\{w_n(r,\theta) \cdot r^{j\alpha_m + p} e^{ik\theta}\}$$

with k, p and $\alpha_m$ being parameters of said basis function, and $w_n(r,\theta)$ is a window function.

70. An apparatus as claimed in claim 64, wherein said means for detection comprises:
means for correlating said image with said second pattern to form a correlation image; and
means for locating at least one magnitude peak in said correlation image, said peak corresponding to a centre position where said first basis pattern was embedded into said image.

71. An image processing apparatus for adding registration marks to an image, said apparatus comprising:
means for maintaining at least one basis pattern, said basis pattern(s) being formed substantially from a basis function, wherein said basis function is defined such that said basis function when correlated with a scaled and rotated version of said basis function is substantially equal to the auto-correlation of said function within a complex multiplicative constant;

means for adding said basis pattern(s) to said image at at least three predetermined offsets relative to a center of said image.

72. An apparatus as claimed in claim 71, wherein said at least one basis pattern is a real function—substantially formed from said basis function.

73. An apparatus as claimed in claim 71 wherein said basis function is a function $g(r,\theta)$ defined such that:

$$g(r,\theta) \otimes \{g(a.r,\theta+\phi) = c.[g(r,\theta) \otimes g(r,\theta)]$$

wherein r is a displacement distance, $\theta$ and $\phi$ are angles, a is a positive real number, and c is a complex number not dependent on said displacement distance r nor said angle $\theta$.

74. An apparatus as claimed in claim 71, wherein said basis function is a function $g(r,\theta)$ defined such that:

$$g(r,\theta) \otimes \aleph \{g(a.r,\theta+\phi)\} = [g(r,\theta) \otimes \aleph \{c.g(r,\theta)\}]$$

wherein $\aleph$ defines a real or imaginary component, r is a displacement distance, $\theta$ and $\phi$ are angles, a is a positive real number, and c is a complex number not dependent on said displacement distance r nor said angle $\theta$.

75. An apparatus as claimed in claim 71, wherein said basis function is of the form:

$$g_{pmk}(r,\theta) = r^{j\alpha_m + p} e^{ik\theta},$$

with k, p and $\alpha_m$ being parameters of said basis function.

76. An image processing apparatus for registering a transformed image, wherein a first basis pattern is embedded in said image before transformation at at least three predetermined positions, said apparatus comprising:
   means for maintaining a second basis pattern;
   means for detecting said first basis pattern in said transformed image using said second basis pattern, said first and second basis patterns being formed substantially from a basis function, wherein said basis function is defined such that said basis function when correlated with a scaled and rotated version of said basis function is substantially equal to the auto-correlation of said function within a complex multiplicative constant;
   means for comparing positions of said first pattern with said predetermined positions;
   means for determining linear transformations for transforming said positions of said first pattern with said predetermined positions; and
   means for transforming said image to invert said linear transformations.

77. An apparatus as claimed in claim 76, wherein said first basis pattern is a real function—substantially formed from said basis function.

78. An apparatus as claimed in claim 76, wherein said basis function is a function $g(r,\theta)$ defined such that:

$$g(r,\theta) \otimes g(a.r,\theta+\phi) = c.[g(r,\theta) \otimes g(r,\theta)]$$

wherein r is a displacement distance, $\theta$ and $\phi$ are angles, a is a positive real number, and c is a complex number not dependent on said displacement distance r nor said angle $\theta$.

79. An apparatus as claimed in claim 76, wherein said basis function is a function $g(r,\theta)$ defined such that:

$$g(r,\theta) \otimes \aleph \{g(a.r,\theta+\phi)\} = [g(r,\theta) \otimes \aleph \{c.g(r,\theta)\}]$$

wherein $\aleph$ defines a real or imaginary component, r is a displacement distance, $\theta$ and $\phi$ are angles, a is a positive real number, and c is a complex number not dependent on said displacement distance r nor said angle $\theta$.

80. An apparatus as claimed in claim 76, wherein said basis function is of the form:

$$g_{pmk}(r,\theta) = r^{j\alpha_m + p} e^{ik\theta},$$

with k, p and $\alpha_m$ being parameters of said basis function.

81. An apparatus as claimed in claim 76, wherein said first basis pattern is of the form:

$$g_{pmkn}(r,\theta) = \Re\{w_n(r,\theta) . r^{j\alpha_m + p} e^{ik\theta}\}$$

with k, p and $\alpha_m$ being parameters of said basis function, and $w_n(r,\theta)$ is a window function.

82. An apparatus as claimed in claim 76, wherein said means for detection comprises:
   means for correlating said transformed image with said second pattern to form a correlation image; and
   means for locating at least three magnitude peaks in said correlation image, said peaks determining the positions of said first basis pattern in said transformed image.

83. A program stored in a memory medium for embedding a watermark into an image, said program comprising:
   code for maintaining at least one basis pattern; and
   code for adding said basis pattern(s) to said image, wherein said basis pattern(s) is formed substantially from a basis function, said basis function being defined such that said basis function when correlated with a scaled and rotated version of said basis function is substantially equal to the auto-correlation of said function within a complex multiplicative constant.

84. A program as claimed in claim 83, wherein said at least one basis pattern is a real function—substantially formed from said basis function.

85. A program as claimed in claim 83, wherein said basis function is a function $g(r,\theta)$ defined such that:

$$g(r,\theta) \otimes g(a.r,\theta+\phi) = c.[g(r,\theta) \otimes g(r,\theta)]$$

wherein r is a displacement distance, $\theta$ and $\phi$ are angles, a is a positive real number, and c is a complex number not dependent on said displacement distance r nor said angle $\theta$.

86. A program as claimed in claim 83, wherein said basis function is a function $g(r,\theta)$ defined such that:

$$g(r,\theta) \otimes \aleph \{g(a.r,\theta+\phi)\} = [g(r,\theta) \otimes \aleph \{c.g(r,\theta)\}]$$

wherein $\Re$ defines a real or imaginary component, r is a displacement distance, $\theta$ and $\phi$ are angles, a is a positive real number, and c is a complex number not dependent on said displacement distance r nor said angle $\theta$.

87. A program as claimed in claim 83, wherein said basis function is of the form:

$$g_{pmk}(r,\theta) = r^{j\alpha_m + p} e^{ik\theta},$$

with k, p and $\alpha_m$ being parameters of said basis function.

88. A program as claimed in claim 83, wherein a plurality of basis patterns are added with different offsets relative to a center of said image.

89. A program stored in a memory medium for detecting a watermark from an image, said watermark having a first basis pattern embedded, said program comprising:
   code for maintaining a second basis pattern; and
   code for detecting said first basis pattern in said image using said second basis pattern, wherein said first and second basis patterns are formed substantially from a basis function, said basis function being defined such that said basis function when correlated with a scaled and rotated version of said basis function is substantially equal to the auto-correlation of said function within a complex multiplicative constant.

90. A program as claimed in claim 89, wherein said first basis pattern is a real function—substantially formed from said basis function.

91. A program as claimed in claim 89, wherein said basis function is a function $g(r,\theta)$ defined such that:

$$g(r,\theta) \otimes g(a.r,\theta+\phi) = c.[g(r,\theta) \otimes g(r,\theta)]$$

wherein r is a displacement distance, $\theta$ and $\phi$ are angles, a is a positive real number, and c is a complex number not dependent on said displacement distance r nor said angle $\theta$.

92. A program as claimed in claim 89, wherein said basis function is a function $g(r,\theta)$ defined such that:

$$g(r,\theta) \otimes \aleph\{g(a.r,\theta+\phi)\} = [g(r,\theta) \otimes \aleph\{c.g(r,\theta)\}]$$

wherein $\aleph$ defines a real or imaginary component, r is a displacement distance, $\theta$ and are angles, a is a positive real number, and c is a complex number not dependent on said displacement distance r nor said angle $\theta$.

93. A program as claimed in claim 89, wherein said basis function is of the form:

$$g_{pmk}(r,\theta) = r^{j\alpha_m + p} e^{ik\theta},$$

with k, p and $\alpha_m$ being parameters of said basis function.

94. A program as claimed in claim 89, wherein said first basis pattern is of the form:

$$g_{pmkn}(r,\theta) = \Re\{w_n(r,\theta).r^{j\alpha_m + p} e^{ik\theta}\}$$

with k, p and $\alpha_m$ being parameters of said basis function, and $w_n(r,\theta)$ is a window function.

95. A program as claimed in claim 89, wherein said code for detection comprises:
   code for correlating said image with said second pattern to form a correlation image; and
   code for locating at least one magnitude peak in said correlation image, said peak corresponding to a centre position where said first basis pattern was embedded into said image.

96. A program stored in a memory medium for adding registration marks to an image, said program comprising:
   code for maintaining at least one basis pattern, wherein said basis pattern(s) is formed substantially from a basis function, said basis function being defined such that said basis function when correlated with a scaled and rotated version of said basis function is substantially equal to the auto-correlation of said function within a complex multiplicative constant;
   code for adding said basis pattern(s) to said image at at least three predetermined offsets relative to a center of said image.

97. A program stored in a memory medium for registering a transformed image, wherein a first basis pattern is embedded in said image before transformation at at least three predetermined positions, said program comprising:
   code for maintaining a second basis pattern;
   code for detecting said first basis pattern in said transformed image using said second basis pattern, wherein said first and second basis patterns are formed substantially from a basis function, said basis function being defined such that said basis function when correlated with a scaled and rotated version of said basis function is substantially equal to the auto-correlation of said function within a complex multiplicative constant;
   code for comparing positions of said first pattern with said predetermined positions;
   code for determining linear transformations for transforming said positions of said first pattern with said predetermined positions; and
   code for transforming said image to invert said linear transformations.

98. A program as claimed in claim 97, wherein said code for detection comprises:
   code for correlating said transformed image with said second pattern to form a correlation image; and
   code for locating at least three magnitude peaks in said correlation image, said peaks determining the positions of said first basis pattern in said transformed image.

* * * * *

UNITED STATES PATENT AND TRADEMARK OFFICE
CERTIFICATE OF CORRECTION

PATENT NO. : 7,031,493 B2
APPLICATION NO. : 09/983031
DATED : April 18, 2006
INVENTOR(S) : Peter Alleine Fletcher et al.

It is certified that error appears in the above-identified patent and that said Letters Patent is hereby corrected as shown below:

ON THE TITLE PAGE
At Item (57), Abstract, Line 15, "(830,950)" should read --(830,950).--.

COLUMN 1
Line 16, "distributions" should read --distribution,--.
Line 18, "authors" should read --authors.--.

COLUMN 2
Line 3, "step" should read --steps--.
Line 26, "step" should read --steps--.
Line 32, "constant;" should read --constant; and--.
Line 59, "step" should read --steps--.

COLUMN 4
Line 9, "watemarking" should read --watermarking--.
Line 13, "functions" should read --function,--.
Line 44, "resealed" should read --rescaled--.

COLUMN 5
Line 33, "$|I_{min}|$" should read --$|I_{mn}|$--.

COLUMN 8
Line 31, "$F^m$" should read --$F^*$--, and "G" should read --.G--.
Line 36, "$F^m$" should read --$F^*$--.
Line 39, "$\Theta$" (all occurrences) should read --$\otimes$--.
Line 40, "$\Theta$" (all occurrences) should read --$\otimes$--.
Line 56, "$\alpha_m$" should read --$\alpha_n$--.
Line 61, "$q^{i\alpha m}$" should read --$q^{-i\alpha n}$ --, and "$\alpha_m - \alpha_m$" should read --$\alpha_m - \alpha_n$--.

COLUMN 9
Line 39, "$\aleph$defines" should read --$\aleph$ defines--.
Line 40, "$\alpha$" should read --a--.
Line 56, "asymnmetry" should read --asymmetry--.

COLUMN 11
Line 49, "inage" should read --image--.

UNITED STATES PATENT AND TRADEMARK OFFICE
CERTIFICATE OF CORRECTION

PATENT NO. : 7,031,493 B2
APPLICATION NO. : 09/983031
DATED : April 18, 2006
INVENTOR(S) : Peter Alleine Fletcher et al.

It is certified that error appears in the above-identified patent and that said Letters Patent is hereby corrected as shown below:

COLUMN 12

Line 25, "$\sum_{n=1}\ ^{N}$" should read -- $\sum_{n=1}^{N}$ --.

Line 33, "$\sum_{n=1}\ ^{N}$" should read -- $\sum_{n=1}^{N}$ --.

COLUMN 15
Line 28, "a x" should read --an x--.

COLUMN 16

Line 43, "$C_{(B-3)}$" should read --$C_{(B-3)})$--.

Line 44, "and ⌴" should read --and ⌊⌋--.

COLUMN 17
Line 48, "now" should read --now be--.

COLUMN 18
Line 2, "making" should read --marking--.
Line 44, "such" should read --such as--.
Line 53, "art" should read --art.--.

COLUMN 19
Line 67, "step" should read --steps--.

COLUMN 20
Line 12, "I,in n," should read --in--.
Line 23, "ℵdefines" should read --ℵ defines--.
Line 42, "claim 7" should read --claim 7,--.
Line 52, "claim 9" should read --claim 9,--.
Line 56, "claim 9" should read --claim 9,--.
Line 60, "claim 9" should read --claim 9,--.
Line 61, "$w_n(r,\theta)$contains" should read --$w_n(r,\theta)$ contains--.
Line 64, "step" should read --steps--.

UNITED STATES PATENT AND TRADEMARK OFFICE
CERTIFICATE OF CORRECTION

PATENT NO. : 7,031,493 B2
APPLICATION NO. : 09/983031
DATED : April 18, 2006
INVENTOR(S) : Peter Alleine Fletcher et al.

It is certified that error appears in the above-identified patent and that said Letters Patent is hereby corrected as shown below:

COLUMN 21
Line 5, "and" should read --$α_l$ and--.
Line 10, "step" should read --steps--.
Line 33, "ℵdefines" should read --ℵ defines--.
Line 38, "step" should read --steps--.
Line 61, "ℵdefines" should read --ℵ defines--.

COLUMN 22
Line 24, "ℵdefines" should read --ℵ defines--.
Line 52, "farther" should read --further--.
Line 55, "step" should read --steps--.
Line 62, "constant;" should read --constant; and--.

COLUMN 23
Line 1, "claim 31" should read --claim 31,--.
Line 12, "ℵdefines" should read --ℵ defines--.
Line 55, "ℵdefines" should read --ℵ defines--.
Line 67, "r" should read --.r--.

COLUMN 24
Line 34, "ℵdefines" should read --ℵ defines--.
Line 52, "claim 49" should read --claim 49,--.
Line 62, "claim 51" should read --claim 51,--.
Line 66, "claim 51" should read --claim 51,--.

COLUMN 25
Line 3, "claim 51" should read --claim 51,--.
Line.43, "ℵdefines" should read --ℵ defines--.

COLUMN 26
Line 4, "ℵdefines" should read --ℵ defines--.
Line 35, "ℵdefines" should read --ℵ defines--.
Line 67, "constant;" should read --constant; and--.

UNITED STATES PATENT AND TRADEMARK OFFICE
CERTIFICATE OF CORRECTION

| | |
|---|---|
| PATENT NO. | : 7,031,493 B2 |
| APPLICATION NO. | : 09/983031 |
| DATED | : April 18, 2006 |
| INVENTOR(S) | : Peter Alleine Fletcher et al. |

It is certified that error appears in the above-identified patent and that said Letters Patent is hereby corrected as shown below:

COLUMN 27
Line 7, "claim 71" should read --claim 71,--.
Line 9, "⊗{" should read --⊗--
Line 16, "אg" should read --א{g--.
Line 17, "אdefines" should read --א defines--.
Line 60, "אdefines" should read --א defines--.

COLUMN 28
Line 40, "אdefines" should read --א defies--.

COLUMN 29
Line 11, "אdefines" should read --א defines--.
Line 12, "θand" should read --θ and ϕ--.

COLUMN 30
Line 5, "constant;" should read --constant; and--.

Signed and Sealed this

Second Day of January, 2007

JON W. DUDAS
*Director of the United States Patent and Trademark Office*